United States Patent
Hu et al.

(10) Patent No.: US 12,556,910 B2
(45) Date of Patent: Feb. 17, 2026

(54) KEY DERIVATION METHOD, APPARATUS, AND SYSTEM

(71) Applicant: HUAWEI TECHNOLOGIES CO., LTD., Shenzhen (CN)

(72) Inventors: Li Hu, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 18/191,944

(22) Filed: Mar. 29, 2023

(65) Prior Publication Data

US 2023/0239689 A1 Jul. 27, 2023

Related U.S. Application Data

(63) Continuation of application No. PCT/CN2020/119760, filed on Sep. 30, 2020.

(51) Int. Cl.
*H04W 12/041* (2021.01)
*H04W 12/06* (2021.01)

(52) U.S. Cl.
CPC ......... *H04W 12/041* (2021.01); *H04W 12/06* (2013.01)

(58) Field of Classification Search
CPC .................. H04W 12/041; H04W 12/06
See application file for complete search history.

(56) References Cited

U.S. PATENT DOCUMENTS

| | | | |
|---|---|---|---|
| 2016/0127896 A1 | 5/2016 | Lee et al. | |
| 2020/0280849 A1 | 9/2020 | Ito et al. | |
| 2021/0400475 A1* | 12/2021 | Lehtovirta | H04W 12/04 |
| 2022/0159460 A1* | 5/2022 | Ben Henda | H04W 12/084 |
| 2022/0377546 A1* | 11/2022 | Mazinani | H04W 12/10 |

FOREIGN PATENT DOCUMENTS

| | | | |
|---|---|---|---|
| CN | 108347417 A | 7/2018 | |
| CN | 109691157 A | 4/2019 | |
| CN | 110612729 A | 12/2019 | |
| EP | 3912396 B1 * | 12/2023 | H04W 60/00 |

(Continued)

OTHER PUBLICATIONS

Nokia et al., "Resolution of editors note on AAA", 3GPP TSG-SA3 Meeting #99e, e-meeting, May 11-15, 2020, S3-201240, 2 pages.

(Continued)

*Primary Examiner* — Charles T Shedrick
(74) *Attorney, Agent, or Firm* — Maier & Maier, PLLC

(57) ABSTRACT

A key derivation method, an apparatus, and a system. The method includes: user equipment (UE) receives an authentication success message from a mobility management function network element, generates a master session key (MSK) and an extended master session key (EMSK) based on the authentication success message; and determines whether an authentication device is located outside a 3rd generation partnership project (3GPP) network, to determine whether to obtain Kausf based on the EMSK or the MSK. Therefore, the UE can be compatible with a key derivation manner used when the authentication device is located outside the 3GPP network and a key derivation manner used when the authentication device is located inside the 3GPP network.

20 Claims, 8 Drawing Sheets

(56) References Cited

FOREIGN PATENT DOCUMENTS

| WO | 2016195907 A1 | 12/2016 | | |
|---|---|---|---|---|
| WO | WO-2019160069 A1 | * | 8/2019 | ............ H04W 8/205 |
| WO | WO-2019194155 A1 | * | 10/2019 | ............ H04L 63/205 |
| WO | WO-2020090886 A1 | * | 5/2020 | ............ H04W 12/041 |
| WO | WO-2020173863 A1 | * | 9/2020 | ............ H04W 12/084 |

OTHER PUBLICATIONS

Huawei, et al., "Evaluation on indication of MSK key derivation". 3GPP TSG SA WG3 Meeting #104-e, e-meeting, Aug. 16-27, 2021, S3-212699, 6 pages.

"Computation of Key in AUSF for EAP-AKA", Nokia, 3GPP TSG SA WG3 (Security) Meeting #88-Bis, S3-172458, Oct. 9-13, 2017 Singapore, 3 pages.

Aboba et al., "Extensible Authentication Protocol (EAP)", RFC3748, Network Working Group, Jun. 2004, 67 pages.

Simon et al., "The EAP-TLS Authentication Protocol", RFC5216, Network Working Group, Mar. 2008, 34 pages.

Funk et al., "Extensible Authentication Protocol Tunneled Transport Layer Security Authenticated Protocol Version 0 (EAP-TTLSv0)", RFC5281,Network Working Group, Aug. 2008, 51 pages.

"3rd Generation Partnership Project; Technical Specification Group Services and System Aspects;Security architecture and procedures for 5G system(Release 15)", 3GPP TS 33.501 V15.10.0:, Sep. 2020, 192 pages.

"3rd Generation Partnership Project; Technical Specification Group Core Network and Terminals;Non-Access-Stratum (NAS) protocol for 5G System (5GS);Stage 3;(Release 17)", 3GPP TS 24.501 V17.0.0, Sep. 2020, 728 pages.

"3rd Generation Partnership Project;Technical Specification Group Services and System Aspects;System architecture for the 5G System (5GS);Stage 2(Release 16)", 3GPP TS 23.501 V16.6.0, Sep. 2020, 447 pages.

"3rd Generation Partnership Project; Technical Specification Group Core Network and Terminals; Non-Access-Stratum (NAS) functions related to Mobile Station (MS) in idle mode; (Release 17)", 3GPP TS 26.122 V17.1.0, Dec. 2020, 90 pages.

* cited by examiner

KEY DERIVATION METHOD, APPARATUS, AND SYSTEM

CROSS-REFERENCE TO RELATED APPLICATIONS

This application is a continuation of International Application No. PCT/CN2020/119760, filed on Sep. 30, 2020, the disclosure of which is hereby incorporated by reference in its entirety.

TECHNICAL FIELD

The embodiments relates to the field of communication technologies, a key derivation method, an apparatus, and a system.

BACKGROUND

The importance of information security is beyond doubt. With the continuous development of communication technologies, higher requirements are raised on the secure transmission of information. Encrypting information by using keys is an important means to implement information security. In a communication system, after user equipment (UE) and a network perform mutual authentication, the UE may exchange information with the network side. To ensure information security, the UE needs to perform encryption or integrity protection on information to be transmitted to the network side. For example, encryption or integrity protection may be performed on information exchanged between the UE and an access and mobility management function (AMF) network element by using a derived key of a Kamf.

The Kamf may be derived from an authentication service key Kausf. To implement communication between the UE and the AMF network element, a Kamf generated by the UE and a Kamf generated by the AMF network element need to be the same. Therefore, Kausf generated by the UE and Kausf generated on the network side also need to be the same.

In a process of authenticating the UE by the network, the UE may be authenticated by using an authentication server function (AUSF) network element as an authentication device, or the UE may be authenticated by using a credentials provider (CdP) located outside a 3rd generation partnership project (3GPP) network as an authentication device. When the AUSF network element is used as the authentication device, both the AUSF network element and the UE obtain Kausf from an extended master session key (EMSK). When the CdP is used as the authentication device, the AUSF network element may obtain Kausf based on a key from the CdP. According to the protocol (RFC 3748), the EMSK cannot be transmitted out of the CdP. Therefore, when the CdP is used as the authentication device, the key used to obtain Kausf is not the EMS K.

In this way, when the AUSF network element is used as the authentication device and the CdP network element is used as the authentication device, keys used to obtain Kausf are different. In addition, in a current technology, the UE cannot perceive whether the network side uses the AUSF network element or the CdP to authenticate the UE. Therefore, the UE cannot determine which key is used to obtain Kausf.

SUMMARY

The embodiments may provide a key derivation method, an apparatus, and a system. UE may determine whether an authentication device is located outside a 3GPP network, to determine a manner of obtaining Kausf.

According to a first aspect, an embodiment may provide a key derivation method. The method includes: User equipment (UE) receives an authentication success message from a mobility management function network element, where the authentication success message indicates that the UE is successfully authenticated by an authentication device; generates a master session key (MSK) and an extended master session key (EMSK) based on the authentication success message; determines whether the authentication device is located outside a 3rd generation partnership project (3GPP) network; and when the authentication device is located outside the 3GPP network, generates an authentication service key (Kausf) based on the MSK.

The UE may determine, depending on whether the authentication device is located outside the 3GPP network, whether to obtain the Kausf based on the EMSK or the MSK, so that Kausf generated by the UE is the same as the Kausf generated on a network side, to ensure smooth communication between the UE and the network side.

In an implementation, the method further includes: When the authentication device is located inside the 3GPP network, the UE generates the Kausf based on the EMSK.

The UE may be compatible with a network architecture in which the authentication device is located outside the 3GPP network and a network architecture in which the authentication device is located inside the 3GPP network.

In an implementation, the method further includes: The UE receives first indication information from the mobility management function network element, where the first indication information indicates that the authentication device is located outside the 3GPP network or inside the 3GPP network. An implementation in which the UE determines whether the authentication device is located outside the 3GPP network may be: The UE determines, based on the first indication information, whether the authentication device is located outside the 3GPP network.

The UE may determine, based on the first indication information, whether to derive the Kausf by using the EMSK or the MSK.

In an implementation, the first indication information includes anti-bidding down between architectures (ABBA). When a value of the ABBA is a first value, the ABBA indicates that the authentication device is located outside the 3GPP network. When a value of the ABBA is a second value, the ABBA indicates that the authentication device is located inside the 3GPP network. For example, the first value may be a non-zero value, and the second value may be 0.

An existing information element ABBA may be used as the first indication information, so that modifications to an existing protocol can be reduced. In another aspect, because the ABBA is also a parameter for deriving a Kamf, if the ABBA is tampered with, the Kamf generated by the UE is different from the Kamf generated by the mobility management function network element. In this way, an attack can be discovered, thereby helping improve communication security.

In an implementation, the UE stores first configuration information. The first configuration information includes second indication information indicating whether the authentication device is located outside the 3GPP network. An implementation in which the UE determines whether the authentication device is located outside the 3GPP network may be: The UE determines, based on the second indication information, whether the authentication device is located outside the 3GPP network.

The UE may determine, based on the preconfigured second indication information in the UE, whether the authentication device is located outside the 3GPP network, and the network side does not need to send indication information to the UE (for example, the mobility management function network element does not need to send the first indication information to the UE). This helps reduce power consumption of the network side device.

In an implementation, an implementation in which the UE determines whether the authentication device is located outside the 3GPP network may be: When the UE obtains an identifier of the authentication device, the UE determines that the authentication device is located outside the 3GPP network. When the UE does not obtain the identifier of the authentication device, the UE determines that the authentication device is located inside the 3GPP network.

In an implementation, an implementation in which the UE generates an authentication service key (Kausf) based on the MSK may be: The UE generates the Kausf based on the MSK and a generation parameter, where the generation parameter includes one or more of the following: an identifier of a serving network that the UE currently accesses or an identifier of the UE.

In an implementation, the identifier of the UE includes a first identifier of the UE, and the first identifier identifies the UE in a network other than the 3GPP network.

According to a second aspect, an embodiment may provide another key derivation method. An authentication service function (AUSF) network element sends a first trigger indication to an authentication device, where the first trigger indication is used to trigger to authenticate user equipment (UE); receives an authentication success message and a first key from the authentication device, where the authentication success message indicates that the UE is successfully authenticated by the authentication device; generates an authentication service key (Kausf) based on the first key; and sends the authentication success message and third indication information to a mobility management function network element, where the third indication information indicates that the authentication device is located outside a 3rd generation partnership project (3GPP) network or inside the 3GPP network.

The AUSF network element may send the third indication information to the mobility management function network element, so that the mobility management function network element can learn of whether the authentication device is located outside the 3GPP network. This helps the mobility management function network element notify the UE whether the authentication device is located outside the 3GPP network. Alternatively, the AUSF network element sends the third indication information to the mobility management function network element, so that the mobility management function network element may forward the third indication information to the UE, and the UE learns of whether the authentication device is located outside the 3GPP network.

In an implementation the AUSF network element generating an authentication service key (Kausf) based on the first key may include: The AUSF network element generates the Kausf based on the first key and a generation parameter, where the generation parameter includes one or more of the following: an identifier of a serving network that the UE currently accesses or an identifier of the UE.

In an implementation, the identifier of the UE includes a first identifier of the UE, and the first identifier identifies the UE in a network other than the 3GPP network.

In an implementation, before the AUSF network element sends a first trigger indication to an authentication device, the method further includes: The AUSF network element determines that the UE needs to perform authentication with the authentication device.

In an implementation, the AUSF network element determining that the UE needs to perform authentication with the authentication device may include: The AUSF network element receives a second identifier of the UE from the mobility management function network element; and determines, based on the second identifier, that the UE needs to perform authentication with the authentication device, where the second identifier is a subscription concealed identifier SUCI or a subscription permanent identifier SUPI.

In an implementation, the AUSF network element determining that the UE needs to perform authentication with the authentication device may include: The AUSF network element receives the second identifier of the UE from the mobility management function network element, where the second identifier is the subscription concealed identifier SUCI or the subscription permanent identifier SUPI; sends a first request message to a unified data management UDM network element, where the first request message includes the SUCI or the SUPI; receives a first response message from the UDM network element, where the first response message includes an identifier of the authentication device; and determines, based on the identifier of the authentication device, that the UE needs to perform authentication with the authentication device.

In an implementation, the method further includes: The AUSF network element determines the first identifier of the UE based on the second identifier of the UE, where the first identifier identifies the UE in a network other than the 3GPP network, the second identifier is the SUCI or the SUPI, and the second identifier is received by the AUSF network element from the mobility management function network element; and sends the first identifier to the authentication device, where the first trigger indication may be used to trigger to authenticate the UE based on an authentication credential corresponding to the first identifier.

Sending the second identifier (that is, the SUCI or the SUPI) of the UE to the authentication device located outside the 3GPP network may be avoided. include second identifier of the UE being transmitted from within the 3GPP network to out of the 3GPP network may be avoided. This avoids leakage of user privacy.

According to a third aspect, an embodiment may provide still another key derivation method. A mobility management function network element receives an authentication success message and third indication information from an authentication service function (AUSF) network element, where the authentication success message indicates that user equipment (UE) is successfully authenticated by an authentication device, and the third indication information indicates that the authentication device is located outside a 3rd generation partnership project (3GPP) network or inside the 3GPP network; and sends the authentication success message and first indication information to the UE, where the first indication information indicates that the authentication device is located outside the 3GPP network or inside the 3GPP network, and the first indication information is determined based on the third indication information.

The first indication information may be sent to the UE, so that the UE can determine, based on the first indication information, whether to derive the Kausf by using an EMSK or an MSK.

In an implementation, the first indication information includes anti-bidding down between architectures (ABBA). The mobility management function network element determines a value of the ABBA as a non-zero value, where when the value of the ABBA is the non-zero value, the ABBA indicates that the authentication device is located outside the 3GPP network.

An existing information element ABBA may be used as the first indication information, so that modifications to an existing protocol can be reduced. In another aspect, because the ABBA is also a parameter for deriving a Kamf, if the ABBA is tampered with, the Kamf generated by the UE is different from the Kamf generated by the mobility management function network element. In this way, an attack can be discovered, thereby helping improve communication security.

According to a fourth aspect, an embodiment may provide still another key derivation method. The method includes: A protocol conversion network element receives a second trigger indication from an authentication service function AUSF network element, where the second trigger indication is used to trigger to authenticate user equipment (UE); sends a third trigger indication to an authentication device, where the third trigger indication is used to trigger to authenticate the UE, and the third trigger indication is obtained based on the second trigger indication; receives an authentication success message and a first key from the authentication device, where the authentication success message indicates that the UE is successfully authenticated by the authentication device; generates an authentication service key Kausf based on the first key; and sends the authentication success message to the AUSF network element.

In an implementation, an implementation in which the protocol conversion network element generates an authentication service key Kausf based on the first key may be: The protocol conversion network element generates Kausf based on the first key and a generation parameter, where the generation parameter includes one or more of the following: an identifier of a serving network or an identifier of the UE.

In an implementation, the identifier of the UE includes a first identifier of the UE, and the first identifier identifies the UE in a network other than a 3rd generation partnership project (3GPP) network.

In an implementation, the method further includes: The protocol conversion network element sends the first identifier of the UE to the authentication device, where the third trigger indication may be used to trigger to authenticate the UE based on an authentication credential corresponding to the first identifier.

Sending the second identifier (that is, the SUCI or the SUPI) of the UE to the authentication device located outside the 3GPP network may be avoided. include The second identifier of the UE being transmitted from within the 3GPP network to out of the 3GPP network may be avoided. This avoids leakage of user privacy.

According to a fifth aspect, an embodiment may provide a communication apparatus. The communication apparatus has some or all functions of the UE in the method examples in the first aspect. For example, functions of the communication apparatus may have some or all functions of the embodiments, or may have a function of independently implementing any embodiment. The functions may be implemented by hardware, or may be implemented by hardware executing corresponding software. The hardware or the software includes one or more units or modules corresponding to the functions.

In an implementation, a structure of the communication apparatus may include a transceiver module and a processing module. The processing module is configured to support the communication apparatus in performing corresponding functions in the foregoing methods. The transceiver module is configured to support communication between the communication apparatus and another device. The communication apparatus may further include a storage module. The storage module may be coupled to the processing module and the transceiver module, and stores a computer program and data that are necessary for the communication apparatus.

In an implementation, the communication apparatus includes: the transceiver module, configured to receive an authentication success message from a mobility management function network element, where the authentication success message indicates that UE is successfully authenticated by an authentication device; and the processing module, configured to generate an MSK and an EMSK based on the authentication success message; determine whether the authentication device is located outside a 3GPP network; and when the authentication device is located outside the 3GPP network, generate Kausf based on the MSK.

In an example, the processing module may be a processor, the transceiver module may be a transceiver, and the storage module may be a memory.

In an implementation, the communication apparatus includes: the transceiver, configured to receive an authentication success message from a mobility management function network element, where the authentication success message indicates that UE is successfully authenticated by an authentication device; and the processor, configured to generate an MSK and an EMSK based on the authentication success message; determine whether the authentication device is located outside a 3GPP network; and when the authentication device is located outside the 3GPP network, generate Kausf based on the MSK.

According to a sixth aspect, an embodiment may provide another communication apparatus. The communication apparatus has some or all functions of the AUSF network element in the method examples in the second aspect. For example, functions of the communication apparatus may have some or all functions of the embodiments, or may have a function of independently implementing any embodiment. The functions may be implemented by hardware, or may be implemented by hardware executing corresponding software. The hardware or the software includes one or more units or modules corresponding to the functions.

In an implementation, a structure of the communication apparatus may include a processing module and a transceiver module. The processing module is configured to support the communication apparatus in performing corresponding functions in the foregoing methods. The transceiver module is configured to support communication between the communication apparatus and another device. The communication apparatus may further include a storage module. The storage module may be coupled to the processing module and the transceiver module, and stores a computer program and data that are necessary for the communication apparatus.

In an implementation, the communication apparatus includes: the transceiver module, configured to send a first trigger indication to an authentication device, where the first trigger indication is used to trigger to authenticate UE; receive an authentication success message and a first key from the authentication device, where the authentication success message indicates that UE is successfully authenticated by the authentication device; the processing module, configured to generate Kausf based on the first key; and the transceiver module is further configured to send the authentication success message and third indication information to a mobility management function network element, where the third indication information indicates that the authentication device is located outside a 3GPP network or inside the 3GPP network.

In an example, the processing module may be a processor, the transceiver module may be a transceiver, and the storage module may be a memory.

In an implementation, the communication apparatus includes: the transceiver, configured to send a first trigger indication to an authentication device, where the first trigger indication is used to trigger to authenticate UE; receive an authentication success message and a first key from the authentication device, where the authentication success message indicates that UE is successfully authenticated by the authentication device; the processor, configured to generate Kausf based on the first key; and the transceiver is further configured to send the authentication success message and third indication information to a mobility management function network element, where the third indication information indicates that the authentication device is located outside a 3GPP network or inside the 3GPP network.

According to a seventh aspect, an embodiment may provide still another communication apparatus. The communication apparatus has some or all functions of the mobility management function network element in the method examples in the third aspect. For example, functions of the communication apparatus may have some or all functions of the embodiments, or may have a function of independently implementing any embodiment. The functions may be implemented by hardware or may be implemented by hardware executing corresponding software. The hardware or the software includes one or more units or modules corresponding to the functions.

In an implementation, a structure of the communication apparatus may include a processing module and a transceiver module. The processing module is configured to support the communication apparatus in performing corresponding functions in the foregoing methods. The transceiver module is configured to support communication between the communication apparatus and another device. The communication apparatus may further include a storage module. The storage module may be coupled to the processing module and the transceiver module, and stores a computer program and data that are necessary for the communication apparatus.

In an implementation, the communication apparatus includes: the transceiver module, configured to receive an authentication success message and second indication information from an AUSF network element, where the authentication success message indicates that UE is successfully authenticated by an authentication device, and the second indication information indicates that the authentication device is located outside a 3GPP network or inside the 3GPP network; and send the authentication success message and first indication information to the UE, where the first indication information indicates that the authentication device is located outside the 3GPP network or inside the 3GPP network, and the second indication information is determined based on the first indication information.

In an example, the processing module may be a processor, the transceiver module may be a transceiver, and the storage module may be a memory.

In an implementation, the communication apparatus includes: the transceiver, configured to receive an authentication success message and second indication information from an AUSF network element, where the authentication success message indicates that UE is successfully authenticated by an authentication device, and the second indication information indicates that the authentication device is located outside a 3GPP network or inside the 3GPP network; and send the authentication success message and first indication information to the UE, where the first indication information indicates that the authentication device is located outside the 3GPP network or inside the 3GPP network, and the second indication information is determined based on the first indication information.

According to an eighth aspect, an embodiment may provide still another communication apparatus. The communication apparatus has some or all functions of the protocol conversion function network element in the method examples in the third aspect. For example, functions of the communication apparatus may have some or all functions of the embodiments, or may have a function of independently implementing any embodiment. The functions may be implemented by hardware, or may be implemented by hardware executing corresponding software. The hardware or the software includes one or more units or modules corresponding to the functions.

In an implementation, a structure of the communication apparatus may include a processing module and a transceiver module. The processing module is configured to support the communication apparatus in performing corresponding functions in the foregoing methods. The transceiver module is configured to support communication between the communication apparatus and another device. The communication apparatus may further include a storage module. The storage module may be coupled to the processing module and the transceiver module, and stores a computer program and data that are necessary for the communication apparatus.

In an implementation, the communication apparatus includes: the transceiver module, configured to receive a second trigger indication from an AUSF network element, where the second trigger indication is used to trigger to authenticate UE; send a third trigger indication to an authentication device, where the third trigger indication is used to trigger to authenticate the UE, and the third trigger indication is obtained based on the second trigger indication; and receive an authentication success message and a first key from the authentication device, where the authentication success message indicates that the UE is successfully authenticated by the authentication device.

In an example, the processing module may be a processor, the transceiver module may be a transceiver, and the storage module may be a memory.

In an implementation, the communication apparatus includes: the transceiver, configured to receive a second trigger indication from an AUSF network element, where the second trigger indication is used to trigger to authenticate UE; send a third trigger indication to an authentication device, where the third trigger indication is used to trigger to authenticate the UE, and the third trigger indication is obtained based on the second trigger indication; and receive an authentication success message and a first key from the authentication device, where the authentication success message indicates that the UE is successfully authenticated by the authentication device.

According to a ninth aspect, an embodiment may provide a key derivation system. The system includes one or more communication apparatuses according to the fifth aspect to the eighth aspect.

According to a tenth aspect, an embodiment may provide a non-transitory computer-readable storage medium. The non-transitory computer-readable storage medium stores a computer program, the computer program includes program instructions, and when the program instructions are executed by a communication apparatus, the communication apparatus is enabled to perform the method according to the first aspect.

According to an eleventh aspect, an embodiment may provide a non-transitory computer-readable storage medium. The non-transitory computer-readable storage medium stores a computer program, the computer program includes program instructions, and when the program instructions are executed by a communication apparatus, the communication apparatus is enabled to perform the method according to the second aspect.

According to a twelfth aspect, an embodiment may provide a non-transitory computer-readable storage medium. The non-transitory computer-readable storage medium stores a computer program, the computer program includes program instructions, and when the program instructions are executed by a communication apparatus, the communication apparatus is enabled to perform the method according to the third aspect.

According to a thirteenth aspect, an embodiment may provide a non-transitory computer-readable storage medium. The non-transitory computer-readable storage medium stores a computer program, the computer program includes program instructions, and when the program instructions are executed by a communication apparatus, the communication apparatus is enabled to perform the method according to the fourth aspect.

According to a fourteenth aspect, the embodiments may further provide a computer program product including a computer program. When the computer program product runs on a computer, the computer is enabled to perform the method according to the first aspect.

According to a fifteenth aspect, the embodiments may further provide a computer program product including a computer program. When the computer program product runs on a computer, the computer is enabled to perform the method according to the second aspect.

According to a sixteenth aspect, the embodiments may further provide a computer program product including a computer program. When the computer program product runs on a computer, the computer is enabled to perform the method according to the third aspect.

According to a seventeenth aspect, the embodiments may further provide a computer program product including a computer program. When the computer program product runs on a computer, the computer is enabled to perform the method according to the fourth aspect.

DETAILED DESCRIPTION OF THE EMBODIMENTS

Figure 1A:
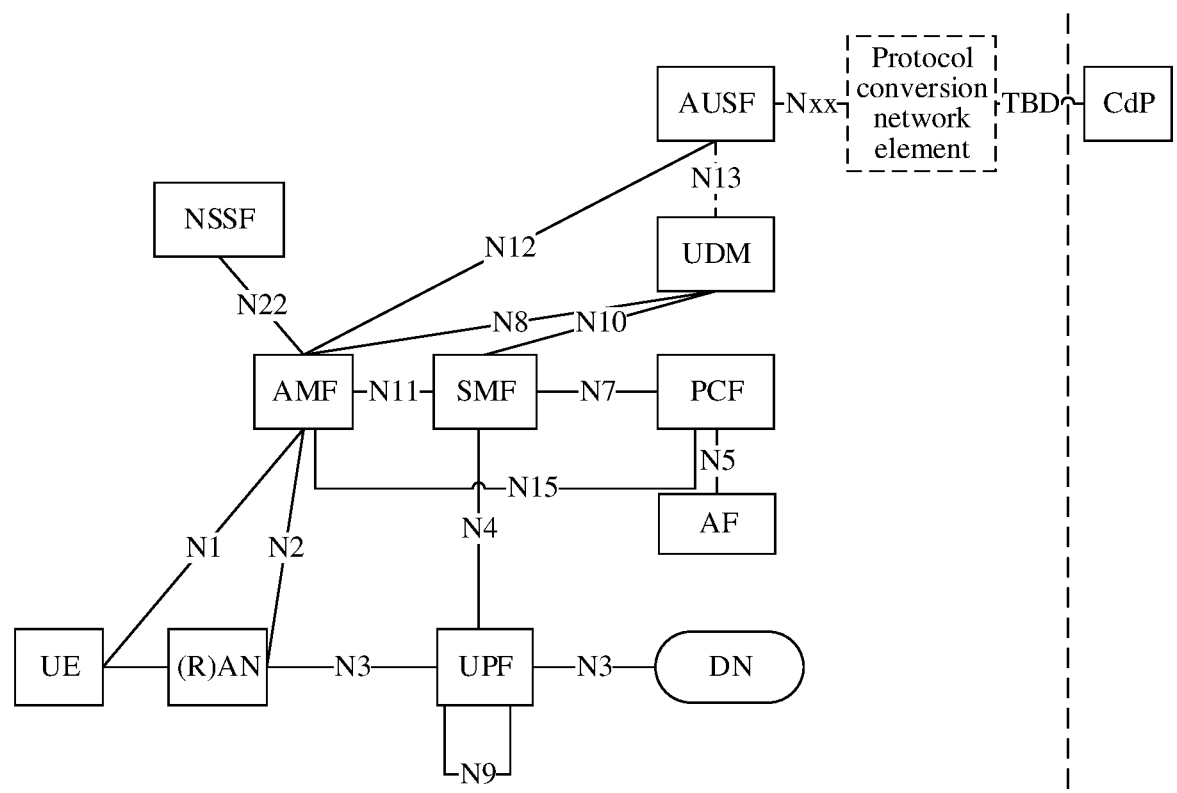
FIG. 1a is a schematic diagram of a network architecture of a 5G system.

To better understand the embodiments, terms in the embodiments are first described.
1. Network Architecture of a 5th Generation (5G) Communication System FIG. 1a is a schematic diagram of a network architecture of a 5G system. The network architecture includes user equipment (UE), an access network (AN) device, a core network element, a data network (DN), a protocol conversion network element, and a credentials provider (CdP).

The access network device may alternatively be a radio access network (RAN) device. The access network device may include a base station (BS), and may be a device that is deployed in a radio access network and that can perform wireless communication with a terminal device. The base station may be in a plurality of forms, such as a macro base station, a micro base station, a relay station, and an access point. For example, the access network device in the embodiments may be a base station in 5G or a base station in long term evolution (LTE). The base station in 5G may also be referred to as a transmission reception point (TRP) or a next generation NodeB gNB).

The core network element may include an access and mobility management function (AMF), an authentication server function (AUSF), unified data management (UDM), a session management function (SMF), a policy control function (PCF), an application function (AF), a user plane function (UPF), and a network slice selection function (NSSF).

The AMF network element may be a termination point of non-access stratum (NAS) signaling and may be responsible for user access and mobility management. The UE and the AMF may communicate with each other by using an N1 NAS message, and a communication message between the UE and the AMF may also be forwarded by using an N2 message of the RAN. The RAN communicates with the AMF by using the N2 message.

A security anchor function (SEAF) network element (not shown in FIG. 1a) has a function of authenticating the UE. Optionally, the AMF network element may have a function of the SEAF network element. In this case, the AMF network element and the SEAF network element may be combined and disposed in one entity.

The AUSF network element has an authentication service function, and is configured to process authentication requests of 3rd generation partnership project (3GPP) access and non-3GPP access.

The UDM network element is configured to manage subscription information of a user, and complete user authentication and authorization.

The SMF network element is responsible for session management, for example, session establishment and deletion of a user, and maintenance of a protocol data unit (protocol data unit, PDU) session context and information for user plane forwarding.

The PCF network element is configured to generate and manage a user, session, and quality of service (QoS) flow processing policy.

The AF network element may provide an application service and may be located inside or outside an operator network.

The UPF network element is configured to process a user packet, such as forwarding and charging.

The NSSF network element is configured to support flexible slice selection based on information such as user-requested and subscribed network slice selection assistance information (NSSAI), a user location area, a slice capacity, and slice current load.

The CdP may store a second authentication credential of the UE and may provide a service of performing authentication on the UE.

The authentication credential of the UE may include a first authentication credential and a second authentication credential. The first authentication credential of the UE is an authentication credential preconfigured by the UE on the UE. The second authentication credential of the UE is an authentication credential preconfigured in an authentication device.

An authentication, authorization, and accounting (AAA) server (not shown in FIG. 1a) is a server program capable of processing a user access request, and provides verification, authorization, and account services, to manage user access to a network server and provide services for a user having access permission.

A default credential server (DCS) (not shown in FIG. 1a) stores a default authentication credential (that is, the first authentication credential) of the UE, and may provide an authentication service for the UE. The default authentication credential is an authentication credential preconfigured on the UE when the UE is at delivery.

The protocol conversion network element is configured to perform protocol conversion for interaction between a network element inside 3GPP and a network element outside 3GPP. For example, for the AUSF network element, the protocol conversion network element may provide lower-layer protocol conversion from a service-based interface (SBI) protocol to an AAA protocol. For the AAA server, the protocol conversion network element may provide lower-layer protocol conversion from an AAA protocol to an SBI protocol. In this embodiment, the protocol conversion network element may be an AAA proxy (AAA-P), an AAA-interworking function (AAA-IWF), or a primary authentication function (PAF). Optionally, the AUSF network element may alternatively have the function provided by the protocol conversion network element. In other words, the AUSF network element and the protocol conversion network element may be combined into one network element. In this case, the network architecture shown in FIG. 1a may not include the protocol conversion network element. It should be noted that a name of the protocol conversion network element is used as an example, and does not constitute a limitation on this embodiment. For example, the protocol conversion network element may also be referred to as an authentication protocol conversion function network element.

The DN is responsible for providing services for the UE, including an operator service, an Internet service, a third-party service, and the like, for example, providing a network access function and a short message service function for the UE.

In the schematic diagram of the network architecture shown in FIG. 1a, interfaces between network elements are further included. For example, N2 indicates an interface between the AMF network element and the RAN device.

2. Non-Public Network (NPN)

The non-public network (NPN) is a 3GPP network established for a non-public purpose, for example, an internal network established in a factory, a school, and a business district. There are two types of NPNs: a standalone NPN (SNPN) and a public network integrated NPN (PNI-NPN). The SNPN does not depend on functions of a public network, but the PNI-NPN needs to depend on the functions of the public network.

3. Procedure of Deriving a Kamf

Figure 1B:
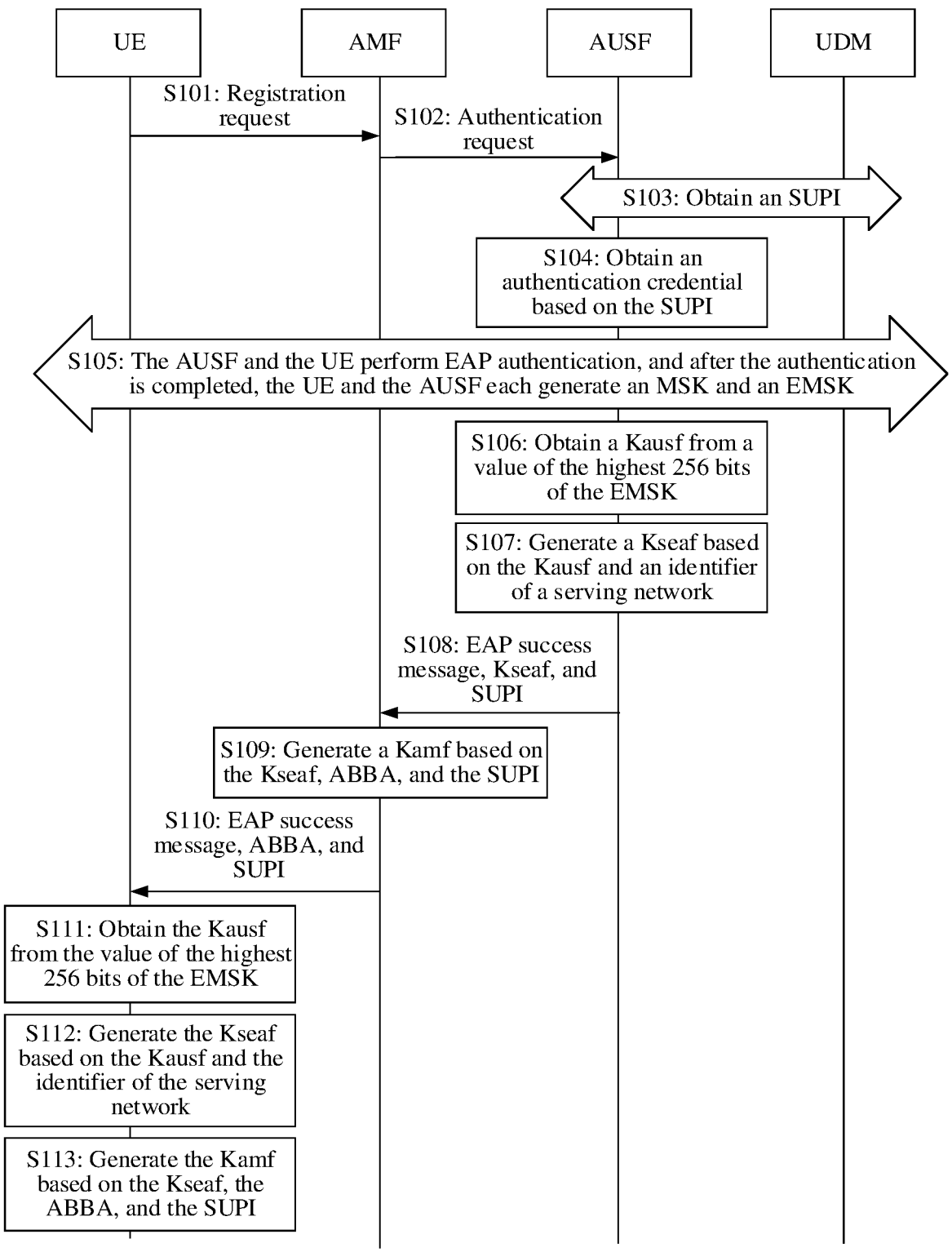
FIG. 1b is a schematic flowchart of existing derivation of a Kamf.

FIG. 1B is a schematic flowchart of existing derivation, of a Kamf, used when an AUSF network element is used as an authentication device. The procedure may include, but is not limited to, step S101 to step S113.

Step S101: UE sends a registration request to an AMF network element, to request to register with a network. The registration request includes a subscription concealed identifier (SUCI) of the UE.

Step S102: After receiving the registration request, the AMF network element sends an authentication request to the AUSF network element, to request the AUSF network element to authenticate the UE. The authentication request includes the SUCI and an identifier of a serving network. The SUCI may include a public land mobile network identifier (PLMN ID) and a routing identifier (RID). The public land mobile network identifier included in the SUCI indicates a home network of the UE, and the serving network indicates a network that the UE currently accesses, for example, a roaming network.

Step S103: After receiving the authentication request, the AUSF network element determines a UDM network element based on the PLMN ID and the routing ID of the SUCI. Then, the UDM network element is requested to parse out a subscription permanent identifier (SUPI) of the UE from the SUCI. The UDM network element notifies the AUSF network element of the SUPI of the UE and a used authentication method (for example, extensible authentication protocol (EAP)-Transport Layer Security Protocol (TLS)).

Step S104: The AUSF network element obtains an authentication credential based on the SUPI.

For example, the AUSF network element locally stores the authentication credential corresponding to the SUPI, and the AUSF obtains the authentication credential based on the SUPI. It should be noted that the authentication credential is an authentication credential preconfigured in the AUSF network element and used to authenticate the UE. The authentication credential is a second authentication credential of the UE.

Step S105: After obtaining the authentication credential, the AUSF network element initiates an EAP-based authentication procedure (for example, EAP-TLS authentication). After the authentication is completed, the UE and the AUSF network element each generate a master session key (MSK) and an extended master session key (EMSK).

It should be noted that the authentication procedure includes two sub-procedures: the UE authenticates the network and the network authenticates the UE. A procedure in which the UE authenticates the network may be performed before a procedure in which the network authenticates the UE is performed. Therefore, after the UE is successfully authenticated by the network, the authentication procedure ends. In FIG. 1B, the network may authenticate the UE by using the AUSF network element.

It should be further noted that the UE and the AUSF network element may alternatively generate the MSK and the EMSK during authentication. For example, the MSK and the EMSK may be generated after the AUSF network element authenticates the UE and before the UE authenticates the AUSF network element.

A manner in which the UE generates the MSK and the EMSK is: generating the MSK and the EMSK based on the first authentication credential. A manner in which the authentication device generates the MSK and the EMSK is: generating the MSK and the EMSK based on the second authentication credential. It should be noted that the first authentication credential and the second authentication credential of the UE may be the same, for example, a symmetric key. Alternatively, the first authentication credential and the second authentication credential of the UE may be different, for example, an asymmetric key and a certificate. When the first authentication credential and the second authentication credential of the UE are the same, the MSK and the EMSK generated by the UE are the same as the MSK and the EMSK generated by the authentication device. When the first authentication credential and the second authentication credential of the UE are different, the manner in which the UE generates the MSK and the EMSK based on the first authentication credential is different from the manner in which the authentication device generates the MSK and the EMSK based on the second authentication credential, so that the MSK and the EMSK generated by the UE are the same as the MSK and the EMSK generated by the authentication device. For example, a manner such as Diffie-Hellman (DH) key exchange is used.

Step S106: The AUSF network element obtains a first intermediate key (that is, an authentication service key Kausf) from a value of the highest 256 bits of the EMSK.

Step S107: The AUSF network element generates a second intermediate key such as a security anchor key (Kseaf) based on Kausf and the identifier of the serving network.

Step S108: The AUSF network element sends an EAP success message, the Kseaf, and the SUPI to the AMF network element. The EAP success message indicates that the UE is successfully authenticated by the AUSF network element.

Step S109: After receiving the EAP success message, the Kseaf, and the SUPI, the AMF network element generates a Kamf based on the Kseaf, anti-bidding down between architectures (anti-bidding down between architectures, ABBA), and the SUPI.

Step S110: The AMF network element sends the EAP success message, the ABBA, and the SUPI to the UE.

Step S111: The UE receives the EAP success message, learns that the UE is successfully authenticated, and obtains Kausf from the value of the highest 256 bits of the EMS K.

Step S112: The UE generates the Kseaf based on Kausf and the identifier of the serving network.

Step S113: The UE generates a Kamf based on the Kseaf, the ABBA, and the SUPI.

Through the foregoing procedure, the AMF network element and the UE each generate the Kamf. Therefore, subsequently, the UE and the AMF network element may use a key derived from the Kamf or the Kamf to protect communication. To implement communication between the AMF network element and the UE, the Kamf generated by the AMF network element and the Kamf generated by the UE need to be the same. Therefore, Kausf generated by the AMF network element and Kausf generated by the UE also need to be the same.

4. Authentication Device Located Outside or Inside a 3GPP Network

The authentication device stores an authentication credential of the UE, and is configured to authenticate the accessed UE. In this embodiment, the authentication device may be an AAA server, the CdP in FIG. 1a, a default credential server (DCS), the AUSF network element in FIG. 1a, or another device having a function of performing authentication on the UE. The authentication device may be located inside the 3GPP network or may be located outside the 3GPP network.

The UE can communicate with a network element (for example, the AMF) in the 3GPP network only after the UE is successfully authenticated by the authentication device. To ensure communication security, a key is used to encrypt communication information during communication. After the UE is successfully authenticated by the authentication device, the authentication procedure is finished, and the UE and the authentication device each generate two keys: an MSK and an EMSK.

The 3GPP network may be a network defined in a 3GPP protocol, for example, a network including an access network, a core network, and UE, such as a mobile communication network, a public land mobile network (PLMN), or a non-public network (NPN), or may be a 5G network or a future evolved mobile communication network. The PLMN is a network that is built and operated by a government or a proprietor authorized by a government and that provides land mobile telecommunication services for the public.

The authentication device located inside the 3GPP network means that a network element in the 3GPP network authenticates the UE. In other words, the authentication credential for authenticating the UE is stored in the network element in the 3GPP network. When the authentication device is located inside the 3GPP network, the authentication device may be the AUSF network element in FIG. 1a. It can be understood from the foregoing descriptions that, in this case, after the UE is successfully authenticated by the AUSF network element (that is, the authentication device) based on the EAP method, the UE and the AUSF network element each generate the MSK and the EMSK. When the authentication device is located inside the 3GPP network, for example, when the AUSF network element in the 3GPP network is used as the authentication device to authenticate the UE, a manner in which the AUSF network element and the UE obtain Kausf is: obtaining Kausf from the EMSK.

The authentication device located outside the 3GPP network means that an entity outside the 3GPP network authenticates the UE. In other words, the authentication credential for authenticating the UE is stored in the entity outside the 3GPP network. The entity may be an entity other than a network element of the 3GPP network, and a network element in the 3GPP network trusts a result of authentication performed by the entity on the UE. When the authentication device is located outside the 3GPP network, the authentication device may be the DCS, the AAA server, or the CdP in FIG. 1a. It can be understood from the foregoing descriptions that, in this case, after the UE (which is located outside the 3GPP network) is successfully authenticated by the authentication device based on the EAP method, the UE and the authentication device each generate the MSK and the EMSK. When the authentication device is located outside the 3GPP network, for example, when the CdP outside the 3GPP network is used as the authentication device to authenticate the UE, a manner in which the AUSF network element and the UE obtain Kausf is: obtaining Kausf based on a key from the CdP.

However, according to the existing protocol (RFC 3748), neither the CdP nor the AAA server can transmit the EMSK or a value of the highest 256 bits of the EMSK to another network element. Therefore, when the CdP is used as the authentication device, the key used to obtain Kausf is not the EMSK. In this way, when the AUSF network element is used as the authentication device and the CdP network element is used as the authentication device (in other words, the authentication device is located inside the 3GPP network and the authentication device is located outside the 3GPP network), keys used to obtain Kausf are different. In addition, in a current technology, the UE cannot perceive whether the network side uses the AUSF network element or the CdP to authenticate the UE. Therefore, the UE cannot determine which key is used to obtain Kausf.

5. Derivation Manner 1; Derivation Manner 2; and First Key

To adapt to a case in which the authentication device is located at different locations, this embodiment may provide two derivation manners for obtaining Kausf. Derivation manner 1 is a derivation manner used to adapt to a case that the authentication device is located inside the 3GPP network. Derivation manner 2 is a derivation manner used to adapt to a case that the authentication device is located outside the 3GPP network.

Derivation manner 1 is to obtain Kausf from the EMSK. For example, a value of some bits (for example, the highest 256 bits) of the EMSK is used as Kausf.

Derivation manner 2 is to obtain Kausf from the MSK. For example, a value of some bits (for example, the highest 256 bits) of the MSK is used as Kausf. Optionally, Derivation manner 2 may be: obtaining a first key from the MSK, and then obtaining Kausf from the first key. For example, a value of some bits (for example, the highest 256 bits) of the first key is used as Kausf. The first key may be the MSK, or may be some bits of the MSK. Alternatively, the first key may be derived from the MSK, the first key is obtained by performing an operation such as an operation or processing on the MSK. A name of the first key is not limited. For example, the first key may also be referred to as an AAA-key.

It should be noted that, derivation manners used on the UE side (that is, the UE) and the network side need to be the same, in other words, the UE side and the network side need to use a same key to derive Kausf, to ensure that Kausf generated on the UE side and Kausf generated on the network side are the same. The network side may include a plurality of network elements. For example, the network side may include, but is not limited to, one or more of an AUSF network element, a protocol conversion network element, and a network element located outside the 3GPP network. The "derivation manner used on the network side" means that one or more network elements on the network side participate in a derivation process to obtain Kausf.

For example, when the authentication device is located outside the 3GPP network, on the network side, a device that generates the EMSK and the MSK is the authentication device located outside the 3GPP network, and a device that obtains Kausf is the AUSF network element. The authentication device may provide the first key for the AUSF network element, and the AUSF network element obtains Kausf from the first key.

The foregoing example is a case in which the network side obtains Kausf by using the authentication device (located outside the 3GPP network) and the AUSF network element that participate in the derivation process. Because the first key is obtained from the MSK, for the network side, a manner of deriving Kausf is actually Derivation manner 2.

It can be understood from the foregoing that keys used to generate Kausf are different in different derivation manners. Derivation manner 1 corresponds to a case in which the key used to generate Kausf is the EMSK. Derivation manner 2 corresponds to a case in which the key used to generate Kausf is the MSK (or the first key). It should be noted that, in this embodiment, if the UE determines to use Derivation manner 2, it indicates that the UE obtains Kausf from the MSK. For a network element (for example, the AUSF network element or the protocol conversion network element) that is configured to obtain Kausf and that is on the network side, if it is determined that Derivation manner 2 is used, it indicates that the network element obtains Kausf from the first key (provided by the authentication device).

Figure 1C:
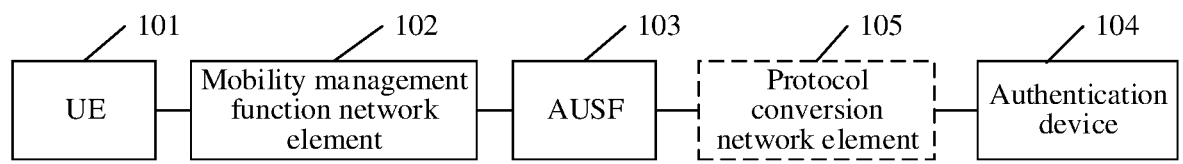
FIG. 1c is a schematic diagram of a network architecture to which an embodiment is applicable.

FIG. 1c is a schematic diagram of a network architecture to which an embodiment may be applicable. FIG. 1c includes UE 101, a mobility management function network element 102, an AUSF network element 103, and an authentication device 104.

The UE 101 in this embodiment may be a device having a wireless transceiver function, and may be deployed on land, including an indoor or outdoor device, a handheld device, or a vehicle-mounted device; or may be deployed on water (for example, on a ship); or may be deployed in the air (for example, on an airplane, a balloon, or an artificial satellite). The UE includes a handheld device, vehicle-mounted device, wearable device, or computing device with a wireless communication function. For example, the UE may be a mobile phone, a tablet computer, or a computer having a wireless transceiver function. The terminal device may alternatively be a virtual reality (VR) terminal device, an augmented reality (AR) terminal device, a smart vehicle terminal device, a wireless terminal in industrial control, a wireless terminal in self driving, an uncrewed aerial vehicle, an uncrewed aerial vehicle controller, a wireless terminal in telemedicine, a wireless terminal in a smart grid, a wireless terminal in a smart city, a wireless terminal in a smart home, or the like. A technology used by the UE and a device form of the UE are not limited in the embodiments.

The mobility management function network element 102 may be the AMF network element in FIG. 1a, or may be a security anchor function (SEAF) network element.

The AUSF network element 103 may be configured to provide a UE authentication service for the mobility management function network element 102.

The authentication device network element 104 is configured to authenticate the UE. The authentication device 104 may be the AUSF network element, an AAA server, a DCS, or the CdP in FIG. 1a. In an implementation, the AUSF network element 103 may authenticate the UE. In this case, the AUSF network element 103 and the authentication device 104 are disposed in one entity. In another implementation, the AUSF network element may trigger the authentication device 104 located outside a 3GPP network to authenticate the UE.

Optionally, the network architecture shown in FIG. 1c may further include a protocol conversion network element 105, configured to provide a protocol conversion function for implementing communication between the AUSF network element 103 and the authentication device 104 (which is located outside the 3GPP network).

It should be noted that names of the mobility management function network element 102, the authentication device

104, and the protocol conversion network element 105 are used as examples, and do not constitute a limitation on this embodiment.

the AUSF network element 103 may send a first trigger indication to the authentication device 104 located outside the 3GPP network. The first trigger indication is used to trigger to authenticate the UE 101. After receiving the first trigger indication, the authentication device 104 performs authentication on the UE 101. After successfully performing authentication on the UE 101, the authentication device 104 generates an MSK and an EMSK, obtains a first key from the MSK, and then sends an authentication success message and the first key to the AUSF network element 103. The authentication success message indicates that the UE 101 is successfully authenticated by the authentication device 104.

After receiving the authentication success message and the first key, the AUSF network element 103 generates Kausf based on the first key, and sends the authentication success message to the UE 101 by using the mobility management function network element 102 (in other words, the authentication success message is transmitted to the UE 101 by using the mobility management function network element 102). Correspondingly, the UE 101 generates an MSK and an EMSK based on the authentication success message, determines whether the authentication device 104 is located outside the 3GPP network, and when the authentication device 104 is located outside the 3GPP network, generates Kausf based on the MSK (that is, obtains Kausf in Derivation manner 2).

By determining whether the authentication device 104 is located outside the 3GPP network, the UE 101 may generate, when determining that the authentication device 104 is located outside the 3GPP network, Kausf by using the MSK. In addition, on the network side, the first key used by the AUSF network element to generate Kausf is obtained by the authentication device 104 from the MSK. The UE 101 and the network side each generate Kausf by using the MSK. Therefore, Kausf generated by the UE 101 is the same as Kausf generated on the network side. This helps ensure communication security.

In this embodiment, the UE 101 may determine, in the following three manners, whether the authentication device 104 is located outside the 3GPP network:

Determining manner 1: The UE 101 determines, based on first indication information from the network side, whether the authentication device 104 is located outside the 3GPP network. A process may be as follows.

In the foregoing process, in addition to sending the authentication success message to the mobility management function network element 102, the AUSF network element 103 further sends third indication information to the mobility management function network element 102. The third indication information indicates that the authentication device 104 is located outside the 3GPP network or inside the 3GPP network. The mobility management function network element 102 may obtain the first indication information based on the received third indication information and send the first indication information and the authentication success message to the UE 101. The first indication information indicates that the authentication device 104 is located outside the 3GPP network or inside the 3GPP network. Correspondingly, after receiving the first indication information, the UE 101 may determine whether the authentication device 104 is located outside the 3GPP network. For descriptions of Determining manner 1, refer to descriptions in the embodiment in FIG. 4.

Determining manner 2: The UE 101 determines, based on second indication information in first configuration information, whether the authentication device 104 is located outside the 3GPP network. The second indication information indicates whether the authentication device 104 is located outside the 3GPP network. The first configuration information may be preconfigured in the UE. For descriptions of Determining manner 2, refer to descriptions in the embodiment in FIG. 5.

Determining manner 3: The UE 101 determines, based on an identifier of the authentication device, whether the authentication device 104 is located outside the 3GPP network. For example, if the UE obtains the identifier of the authentication device, the UE determines that the authentication device 104 is located outside the 3GPP network. For descriptions of Determining manner 3, refer to descriptions in the embodiment in FIG. 5.

It should be noted that the UE 101 determines whether the authentication device 104 is located outside the 3GPP network, so that the UE 101 and the network side generate Kausf in a same derivation manner (that is, Derivation manner 1 or Derivation manner 2), and Kausf generated by the UE is the same as Kausf generated on the network side.

It should be noted that "whether the authentication device is located outside the 3GPP network" mentioned in this embodiment is used as an example. During implementation, all manners in which the network side (for example, the AUSF network element, the protocol conversion network element, or the authentication device located outside the 3GPP network) and the UE generate Kausf in a same derivation manner fall within the scope of the embodiments. For example, "whether the authentication device is located outside the 3GPP network" may be described as "whether to derive Kausf by using the MS", "whether to derive Kausf by using the first key", "whether to derive Kausf by using the MS", "whether to derive Kausf in Derivation manner 1", and "whether to derive Kausf in Derivation manner 2". It may be understood that if it is determined that Kausf is not derived by using the first key or the MSK, it indicates that Kausf may be derived by using the EMSK. Similarly, if it is determined not to use the EMSK to derive Kausf, it indicates that the first key or the MSK may be used to derive Kausf.

"Whether the authentication device is located outside the 3GPP network" may further be described as "whether a key used to derive Kausf is obtained from an external network", "whether a key used to derive Kausf is obtained from an internal network", "whether a key used to derive Kausf is obtained outside the 3GPP network", "whether a key used to derive Kausf is obtained within the 3GPP network", "whether a key used to derive Kausf is obtained from a network element in an internal network", "whether a key used to derive Kausf is obtained from a network element in an external network", "whether a key used to derive Kausf is obtained from a network element in the 3GPP network", and "whether a key used to derive Kausf is obtained from a network element outside the 3GPP network". The "key used to derive Kausf" may be the first key, the MSK, or the EMSK. If it is determined that the key used to derive Kausf is obtained from the external network, the "key used to derive Kausf" is the first key or the MSK. If it is determined that the key used to derive Kausf is not obtained from the external network, the "key used to derive Kausf" is the EMSK.

"Whether the authentication device is located outside the 3GPP network" may also be described as "authentication in which an authentication credential is located in a third party independent of an SNPN is being performed", "external authentication is being performed", "3GPP external authentication is being performed", "authentication in which an authentication credential is located in a third party independent of an SNPN is completed", "external authentication is completed", "3GPP external authentication is completed", "authentication in which an authentication credential is located in a third party independent of an SNPN is about to be performed", "external authentication is about to be performed", "3GPP external certification is about to be performed", and the like. It may be understood that if it is determined that external authentication is being performed, it indicates that Kausf may be derived by using the first key or the MSK. If it cannot be determined that external authentication is being performed, or it is determined that internal authentication is being performed (a network element in an internal network performs authentication on the UE), it indicates that Kausf may be derived by using the EMSK.

It should be noted that the "internal network" and the "external network" mentioned in the embodiments are corresponding concepts. The "internal network" may be a network defined in 3GPP. It may be understood that the "external network" may be understood as a network other than the "internal network". the "internal authentication" and the "external authentication" mentioned in the embodiments are corresponding concepts. The "internal authentication" may mean that a network element in a network defined in 3GPP performs authentication on the UE. It may be understood that the "external authentication" may mean that a network element in a network other than the network defined in 3GPP performs authentication on the UE.

The embodiments may be applied to various communication systems, for example, a 4th generation (4G) communication system, a 4.5G communication system, a 5G communication system, a system integrating a plurality of communication systems, and a future evolved communication system.

It can be understood that the communication system is used to describe the embodiments but does not limit the embodiments. A person skilled in the art may learn that with evolution of a system architecture and emergence of a new service scenario, the embodiments may be also applicable to a similar problem.

The following describes in detail a key derivation method provided in embodiments. It should be noted that names of messages between network elements, names of parameters in the messages, or the like in the following embodiments are only examples, and there may be other names in an implementation. This is not limited in the embodiments. It should be further noted that in the accompanying drawings, steps shown in the embodiments and a sequence of the steps are used as examples, and do not constitute a limitation on the embodiments. It should be understood that performing some steps in the figure or adjusting a sequence of the steps for implementation shall fall within the scope of the embodiments.

Figure 2:
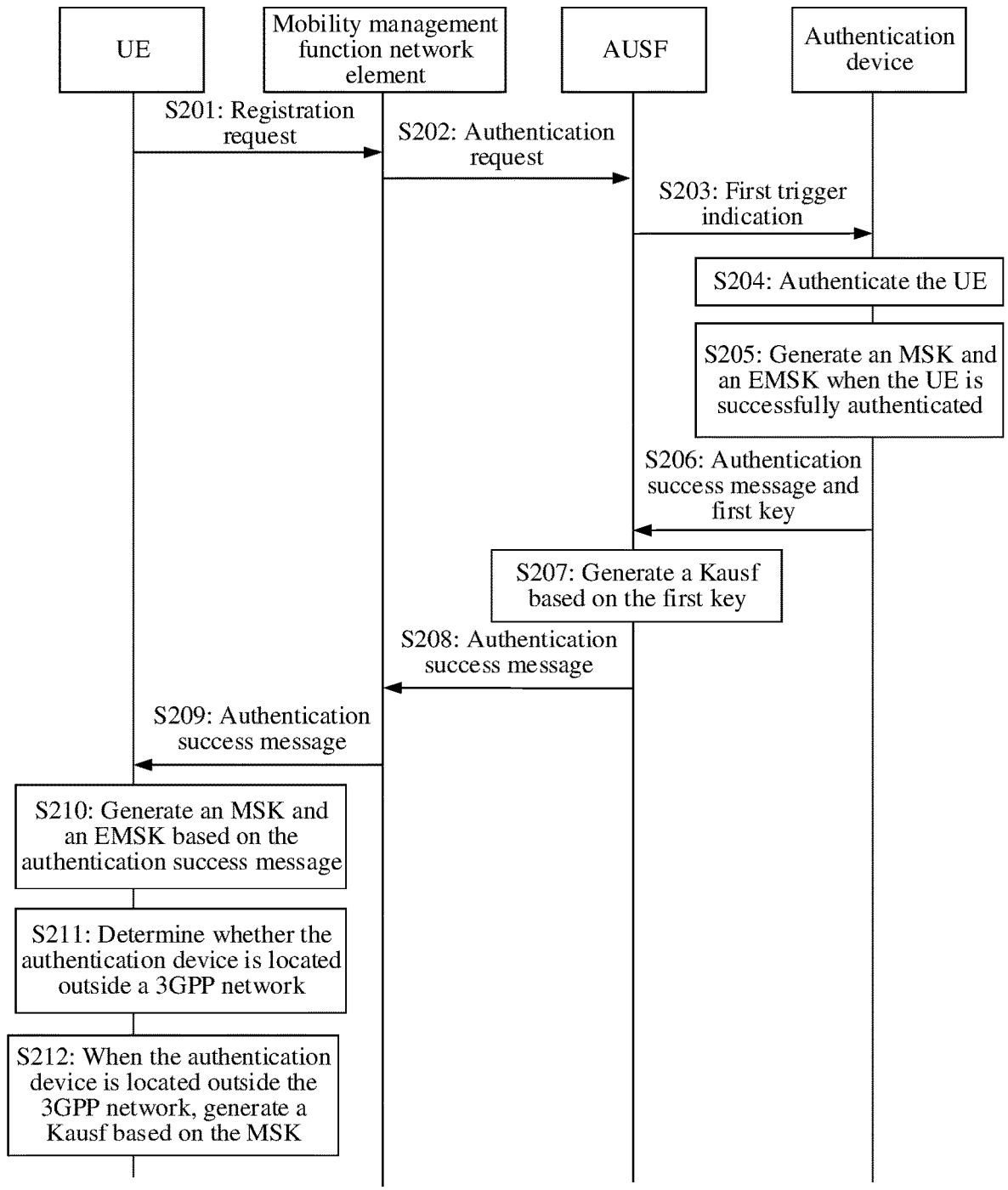
FIG. 2 is a schematic flowchart of a key derivation method according to an embodiment.

FIG. 2 is a schematic flowchart of a key derivation method according to an embodiment. Step S201 and step S210 to step S212 are performed by UE or a chip in the UE. Step S202 and step S209 are performed by a mobility management function network element or a chip in the mobility management function network element. Step S203, step S207, and step S208 are performed by an AUSF network element or a chip in the AUSF network element. Step S204 to step S206 are performed by an authentication device or a chip in the authentication device. The following uses an example in which the key derivation method is performed by the UE, the mobility management function network element, the AUSF network element, and the authentication device for description. The method may include, but is not limited to, the following steps.

Step S201: The UE sends a registration request to the mobility management function network element.

The UE sends the registration request to request to register with a network. The registration request may include a second identifier of the UE, and the second identifier may be a SUCI or a SUPI.

Step S202: After receiving the registration request, the mobility management function network element sends an authentication request to the AUSF network element.

The authentication request requests the AUSF network element to authenticate the UE. The authentication request may include the second identifier of the UE. The mobility management function network element may invoke a UE authentication service (Nausf UEAuthentication) provided by the AUSF network element, to send the registration request (Nausf_UEAuthentication_Authenticate Request) to the AUSF network element.

Step S203: The AUSF network element sends a first trigger indication to the authentication device, where the first trigger indication is used to trigger to authenticate the UE.

In this embodiment, before sending the first trigger indication to the authentication device located outside a 3GPP network, the AUSF network element may determine whether the UE needs to perform authentication with the authentication device. If the AUSF network element determines that the UE needs to perform authentication with the authentication device, it may indicate that the authentication device for authenticating the UE is located outside the 3GPP network, or may indicate that the AUSF network element cannot perform authentication on the UE. Therefore, the AUSF network element may send the first trigger indication to the authentication device, to trigger the authentication device located outside the 3GPP network to authenticate the UE. The first trigger indication may include an EAP-authentication trigger message, for example, an EAP-start (EAP-start) message or an EAP-identity reply message. The first trigger indication may further include the second identifier of the UE.

It may be understood that, if the AUSF network element determines that the UE does not need to perform authentication with the authentication device, it may indicate that the AUSF network element may authenticate the UE, or it may indicate that the authentication device for authenticating the UE is located inside the 3GPP network. Therefore, the AUSF network element may not send the first trigger indication to the authentication device. For example, in this case, the AUSF network element is used as the authentication device for authenticating the UE.

In an implementation, the AUSF network element may determine, in the following manners, that the UE needs to perform authentication with the authentication device located outside the 3GPP network.

In a first manner, the AUSF network element receives the second identifier of the UE from the mobility management function network element, and determines, based on the second identifier, that the UE needs to perform authentication with the authentication device. The second identifier includes a routing identifier RID, and the RID may indicate an identifier of the authentication device that authenticates the UE. If the identifier of the authentication device is different from an identifier of the AUSF network element, it indicates that the authentication device is not the AUSF network element. Therefore, the AUSF network element may determine that the UE needs to perform authentication with the authentication device.

The identifier of the authentication device is used to uniquely identify the authentication device, and the identifier of the AUSF network element is used to uniquely identify the AUSF network element. Optionally, the identifier may be a domain name or an IP address. The AUSF network element may determine the identifier of the authentication device in the following manner The second identifier is the SUCI, and the AUSF network element obtains an IP address of the authentication device based on a PLMN ID and a RID in the SUCI. For another example, the second identifier is in a network access identifier (NAI) format, and the AUSF network element determines the domain name of the authentication device based on the second identifier in the NAI format. The second identifier in the NAI format includes a user part and a domain name part (the form of the second identifier may be: <user part>@ <domain name part>, for example, 1234@abcd). The domain name part may include the domain name of the authentication device.

That the identifier of the authentication device is different from the identifier of the AUSF network element may include, but is not limited to, the following cases: 1. If the domain name of the authentication device is different from a domain name of the AUSF network element, it indicates that the authentication device is not the AUSF network element. 2. If the IP address of the authentication device is different from an IP address of the AUSF network element, it indicates that the authentication device is not the AUSF network element. Therefore, the AUSF network element may determine that the UE needs to perform authentication with the authentication device. 3. If the IP address of the authentication device and the IP address of the AUSF network element do not belong to a same network segment, it may indicate that the authentication device and the AUSF network element are not located in a same local area network. Therefore, it may be considered that the authentication device and the AUSF network element are located in different networks. In addition, because the AUSF network element is located inside the 3GPP network, it may be considered that the authentication device is located inside or outside the 3GPP network. Therefore, the AUSF network element may determine that the UE needs to perform authentication with the authentication device.

Optionally, if the identifier of the authentication device is the same as the identifier of the AUSF network element, it indicates that the UE needs to perform authentication with the AUSF network element. In this case, the AUSF network element does not need to send the first trigger indication. The second identifier may be the SUCI or the SUPI of the UE. It should be noted that the second identifier received by the AUSF network element may be carried in the registration request.

In a second manner, the AUSF network element receives the second identifier of the UE from the mobility management function network element. The second identifier is the SUCI or the SUPI. The AUSF network element sends a first request message to a unified data management UDM network element. The first request message includes the SUCI or the SUPI. The AUSF network element receives a first response message from the UDM network element. The first response message includes an identifier of the authentication device. The AUSF network element determines, based on the identifier of the authentication device, that the UE needs to perform authentication with the authentication device.

The identifier of the authentication device for authenticating the UE may be stored in the UDM network element. The AUSF network element sends a first request message to the UDM network element, to request to obtain the identifier of the authentication device for authenticating the UE. If the identifier of the authentication device is different from an identifier of the AUSF network element, it indicates that the authentication device is not the AUSF network element. Therefore, the AUSF network element may determine that the UE needs to perform authentication with the authentication device.

The UDM network element may obtain, based on the SUCI or the SUPI of the UE, the identifier of the authentication device for authenticating the UE. For example, the UDM network element stores a first correspondence between the SUCI of the UE and the identifier of the authentication device for authenticating the UE. After receiving the first request message, the UDM network element may obtain, based on the SUCI carried in the first request message and the first correspondence, the identifier of the authentication device for authenticating the UE. For another example, the UDM network element stores a second correspondence between the SUPI of the UE and the identifier of the authentication device for authenticating the UE. After receiving the first request message, the UDM network element may obtain, based on the SUPI carried in the first request message and the second correspondence, the identifier of the authentication device for authenticating the UE. Alternatively, after receiving the first request message, the UDM network element may determine the SUPI of the UE based on the SUCI carried in the first request message, and then obtain, based on the SUPI and the second correspondence, the identifier of the authentication device for authenticating the UE.

It should be noted that when the first request message sent by the AUSF network element includes the SUCI, the SUCI may be received by the AUSF network element from the mobility management function network element. When the first request message sent by the AUSF network element includes the SUPI, the SUPI may be received by the AUSF network element from the mobility management function network element, or the SUPI may be determined by the AUSF network element based on the SUCI received from the mobility management function network element. It should be further noted that the second identifier received by the AUSF network element from the mobility management function network element may be carried in the registration request.

In an implementation, the AUSF network element may determine a first identifier of the UE based on the second identifier of the UE, and send the first identifier to the authentication device. The first trigger indication may be used to trigger to authenticate the UE based on an authentication credential (that is, a second authentication credential) corresponding to the first identifier. The first identifier identifies the UE in a network other than the 3GPP network, for example, used to identify the UE in the authentication device located outside the 3GPP network. The first identifier may also be referred to as an external identifier. The first identifier may be a general public subscription identifier (GPSI). The second identifier is the SUCI or the SUPI. The second identifier is received by the AUSF network element from the mobility management function network element. For example, the second identifier is carried in the registration request.

In this manner, sending the second identifier (that is, the SUCI or the SUPI) of the UE to the authentication device located outside the 3GPP network may be avoided so that the second identifier of the UE being transmitted from within the 3GPP network to out of the 3GPP network may be avoided. This avoids leakage of user privacy. Optionally, the first identifier and the first trigger indication may be sent separately or together. This is not limited in this embodiment.

Optionally, authentication credentials corresponding to first identifiers of different UEs may be the same or may be different. When authentication credentials corresponding to first identifiers of different UEs are the same, the authentication device can use one authentication credential to authenticate a plurality of UEs. In an implementation, first identifiers of different UEs may be the same or may be different. When first identifiers of different UEs are the same, the first identifiers of the different UEs may correspond to a same authentication credential.

Optionally, the AUSF network element may determine the first identifier of the UE, or request to obtain the first identifier of the UE from the UDM network element. If the AUSF network element stores the first identifier of the UE, the AUSF network element may determine the first identifier of the UE based on the second identifier of the UE. The first identifier and the second identifier of the UE may be the same or may be different. The AUSF network element sends a request to the UDM network element, to request to obtain the first identifier of the UE. The request includes the second identifier of the UE. The UDM network element stores the first identifier of the UE. The UDM network element determines, based on the second identifier of the UE, the first identifier corresponding to the second identifier, and sends the first identifier to the AUSF network element. For example, the UDM network element parses out the SUPI from the second identifier (for example, the SUCI) of the UE, obtains, based on the SUPI, a GPSI (that is, the second identifier) corresponding to the SUPI, and returns the GPSI to the AUSF. The request sent by the AUSF network element to the UDM network element may be carried in a UE authentication obtaining service request (Nudm_UEAuthentication_Get Request) message.

It should be noted that the AUSF network element may determine the identifier of the authentication device and/or the first identifier of the UE. The first identifier of the UE may be used to determine the identifier of the authentication device or may be sent to the authentication device to trigger the authentication device to authenticate the UE based on the authentication credential corresponding to the first identifier. The identifier of the authentication device may be determined by using the second identifier of the UE, or may be determined by using the first identifier of the UE.

Step S204: The authentication device authenticates the UE.

After receiving the first trigger indication, the authentication device starts to authenticate the UE. An authentication method used by the authentication device is not limited in this embodiment. The authentication method may include, but is not limited to, an EAP authentication method, an EAP-TLS authentication method, an EAP-AKA' authentication method, a 5G AKA authentication method, an authentication method that uses a certificate, an authentication method specified in a protocol (such as RFC 3748, RFC 5216, RFC 5281, and 3GPP TS 33.501), and the like.

The UE stores a first authentication credential of the UE, and the authentication device stores a second authentication credential of the UE. The UE and the authentication device may perform mutual authentication based on the first authentication credential of the UE and the second authentication credential of the UE. For example, the authentication device authenticates the UE based on the second authentication credential of the UE. The UE authenticates the authentication device based on the first authentication credential of the UE. Optionally, the authentication device may obtain the second authentication credential of the UE based on the second identifier or the first identifier of the UE.

In this embodiment, the authentication device may determine an authentication method to be used to authenticate the UE; or the AUSF network element may indicate an authentication method to be used by the authentication device to authenticate the UE. The AUSF network element may determine, by itself, to indicate an authentication method to be used by the authentication device to authenticate the UE; or determine, based on notification information from the UDM network element, to indicate an authentication method to be used by the authentication device to authenticate the UE.

Step S205: When the UE is successfully authenticated, the authentication device generates an MSK and an EMSK.

The authentication device generates the MSK and the EMSK based on the second authentication credential of the UE.

Step S206: The authentication device sends an authentication success message and a first key to the AUSF network element, where the authentication success message indicates that the UE is successfully authenticated by the authentication device.

It should be noted that the authentication success message and the first key may be sent simultaneously, or may be sent separately. In a case of separate sending, the authentication success message may be first sent, or the first key may be first sent. It can be understood from FIG. 2 that the authentication success message is sent from the authentication device, and is forwarded by the AUSF network element and the mobility management function network element in sequence, to be transmitted to the UE. It should be noted that, in an implementation, when a protocol conversion network element is deployed in the network architecture in which the key derivation manner in this embodiment may be implemented, the authentication success message may alternatively be forwarded by the AUSF network element, the protocol conversion network element, and the mobility management function network element, to be transmitted to the UE.

For generation of the first key, refer to Derivation manner 2.

Step S207: The AUSF network element generates an authentication service key Kausf based on the first key.

After receiving the authentication success message and the first key from the authentication device, the AUSF network element may obtain some bits from the first key as Kausf. For example, a value of the highest 256 bits of the first key is used as Kausf.

In an implementation, the AUSF network element may generate Kausf based on the first key and a generation parameter. The generation parameter may include, but is not limited to, one or more of the following: an identifier of a serving network that the UE currently accesses or an identifier of the UE. The serving network that the UE currently accesses may be a home network or a roaming network of the UE. The identifier of the UE may include the first identifier or the second identifier.

Optionally, the generation parameter may include, but is not limited to, one or more of the following: the identifier of the serving network that the UE currently accesses, the identifier of the UE, or a derivation manner parameter. A value of the derivation manner parameter in the generation parameter when the AUSF network element generates Kausf based on the first key and the generation parameter is different from a value of the derivation manner parameter in the generation parameter when the AUSF network element generates Kausf based on the EMSK and the generation parameter. When determining that the UE needs to perform authentication with the authentication device located outside the 3GPP network, the AUSF network element may generate Kausf based on the first key and the generation parameter. When determining that the UE does not need to perform authentication with the authentication device located outside the 3GPP network, the AUSF network element may generate Kausf based on the EMSK and the generation parameter. Therefore, the AUSF network element may determine whether the UE needs to perform authentication with the authentication device located outside the 3GPP network, to determine the value of the derivation manner parameter. The derivation manner parameter is used as one of parameters for determining Kausf, so that Kausf generated when the UE is authenticated outside the 3GPP network is different from Kausf generated when the UE is authenticated inside the 3GPP network. This implements key isolation. The derivation manner parameter may be a 1-bit binary bit (represented as 0 or 1), an input value (such as an FC value) of a key derivation function (KDF) algorithm, or another value. This is not limited in this embodiment.

It should be noted that, for a process in which the AUSF network element derives a Kseaf from Kausf and derives a Kamf from the Kseaf after generating Kausf, refer to descriptions of corresponding procedures in FIG. 1B. Details are not described herein again.

If the AUSF network element determines that the UE does not need to perform authentication with the authentication device, it may indicate that the AUSF network element may authenticate the UE, or it may indicate that the authentication device for authenticating the UE is located inside the 3GPP network. In this case, the AUSF network element may generate Kausf in Derivation manner 1, the AUSF network element generates Kausf based on the EMSK. Optionally, the AUSF network element may generate Kausf based on the EMSK and the generation parameter. For the generation parameter, refer to the foregoing descriptions. Details are not described herein again.

Step S208: The AUSF network element sends the authentication success message to the mobility management function network element.

It should be noted that step S207 and step S208 are performed in any sequence and may be performed simultaneously or sequentially.

Step S209: After receiving the authentication success message from the AUSF network element, the mobility management function network element sends the authentication success message to the UE.

Step S210: The UE generates an MSK and an EMSK based on the authentication success message.

After receiving the authentication success message from the mobility management function network element, the UE generates the MSK and the EMSK. It should be noted that, for a process of performing step S210, refer to the descriptions of step S105 in FIG. 1B. Details are not described herein again.

Step S211: The UE determines whether the authentication device is located outside the 3GPP network.

After receiving the authentication success message from the mobility management function network element, the UE determines, by determining whether the authentication device is located outside the 3GPP network, which derivation manner is used to obtain Kausf. For an implementation of determining, by the UE, whether the authentication device is located outside the 3GPP network, refer to the embodiments shown in FIG. 4 and FIG. 5.

It should be noted that, "whether the authentication device is located outside the 3GPP network", which is determining content of the UE, is merely used as an example. "Whether the authentication device is located outside the 3GPP network" may also be described as "whether to derive Kausf by using the MSK", "whether to derive Kausf by using the first key", "whether to derive Kausf by using the EMSK", "whether to derive Kausf in Derivation manner 1", "whether to derive Kausf in Derivation manner 2", and the like. For details, refer to the foregoing descriptions. Details are not described herein again.

Step S212: When the authentication device is located outside the 3GPP network, the UE generates an authentication service key Kausf based on the MSK.

When it is determined that the authentication device is located outside the 3GPP network, the UE may generate Kausf in Derivation manner 2, generate Kausf based on the MSK. Optionally, the UE may obtain the first key from the MSK, and then generate Kausf based on the first key. For the first key, refer to the foregoing descriptions. Details are not described herein again.

It should be noted that the MSK generated on the network side and the MSK generated by the UE are the same, and the first key obtained on the network side and the first key obtained by the UE that are from the MSKs are also the same. Therefore, Kausf generated on the network side and Kausf generated by the UE are also the same. In this way, the Kseaf and the Kamf generated by the UE are also the same as the Kseaf and the Kamf generated by the network side. This helps ensure smooth communication between the UE and the mobility management function network element. In addition, on the network side, the first key received by the AUSF network element from the authentication device located outside the 3GPP network is obtained from the MSK. Therefore, a protocol specification is not violated (in other words, neither a CdP nor an AAA server can transmit the EMSK or the value of the highest 256 bits of the EMSK to another network element).

In an implementation, the UE may generate Kausf based on the first key and the generation parameter. The generation parameter includes, but is not limited to, one or more of the following: the identifier of the serving network that the UE currently accesses or the identifier of the UE. The serving network that the UE currently accesses may be a home network or a roaming network of the UE. Optionally, the generation parameter includes, but is not limited to, one or more of the following: the identifier of the serving network that the UE currently accesses, the identifier of the UE, or a derivation manner parameter. It should be noted that an execution process in which the UE generates Kausf based on the first key and the generation parameter is the same as an execution process in which the AUSF network element generates Kausf based on the first key and the generation parameter. For details, refer to the descriptions in step S207.

In an implementation, when determining that the authentication device is located inside the 3GPP network, the UE may generate Kausf in Derivation manner 1, may generate Kausf based on the EMSK. For example, some bits are obtained from the EMSK as Kausf. For example, a value of the highest 256 bits of the EMSK is used as Kausf.

In this embodiment, when the authentication device is located outside the 3GPP network, the UE generates Kausf based on the MSK; or when the authentication device is located inside the 3GPP network, the UE generates Kausf based on the EMSK. In this manner, the UE can be compatible with a key derivation manner (that is, Derivation manner 2) used when the authentication device is located outside the 3GPP network and a key derivation manner (that is, Derivation manner 1) used when the authentication device is located inside the 3GPP network.

When the authentication device is located outside the 3GPP network or inside the 3GPP network, keys (that is, the MSK or the EMSK) used to generate Kausf are different, so that generated Kausf may be different. This implements key isolation. When the authentication device is located outside the 3GPP network or inside the 3GPP network, the derivation manner parameter is used as one of parameters for determining Kausf. In addition, when the authentication device is located outside the 3GPP network and inside the 3GPP network, values of the derivation manner parameter are different, so that Kausf generated when the authentication device is located outside the 3GPP network is different from Kausf generated when the authentication device is located inside the 3GPP network. This further implements key isolation.

It should be noted that, with reference to the descriptions in step S211, "whether the authentication device is located outside the 3GPP network", which is determining content of the UE, is merely used as an example. "Whether the authentication device is located outside the 3GPP network" may also be described as "whether to derive Kausf by using the MSK", "whether to derive Kausf by using the first key", "whether to derive Kausf by using the EMSK", "whether to derive Kausf in Derivation manner 1", "whether to derive Kausf in Derivation manner 2", and the like. It may be understood that when the determining content of the UE is different, the determining content of the UE changes accordingly. For example, when the determining content of the UE is "whether to derive Kausf in Derivation manner 2", the determining content of the UE is: determining to derive Kausf in Derivation manner 2 or skipping determining to derive Kausf in Derivation manner 2. For other descriptions of the determining content of the UE, the determining content of the UE is not exemplified herein.

During implementation of this embodiment, the UE determines, depending on whether the authentication device is located outside the 3GPP network, whether to obtain Kausf based on the EMSK or the MSK, so that the UE can be compatible with a key derivation manner (that is, Derivation manner 2) used when the authentication device is located outside the 3GPP network and a key derivation manner (that is, Derivation manner 1) used when the authentication device is located inside the 3GPP network.

Figure 3:
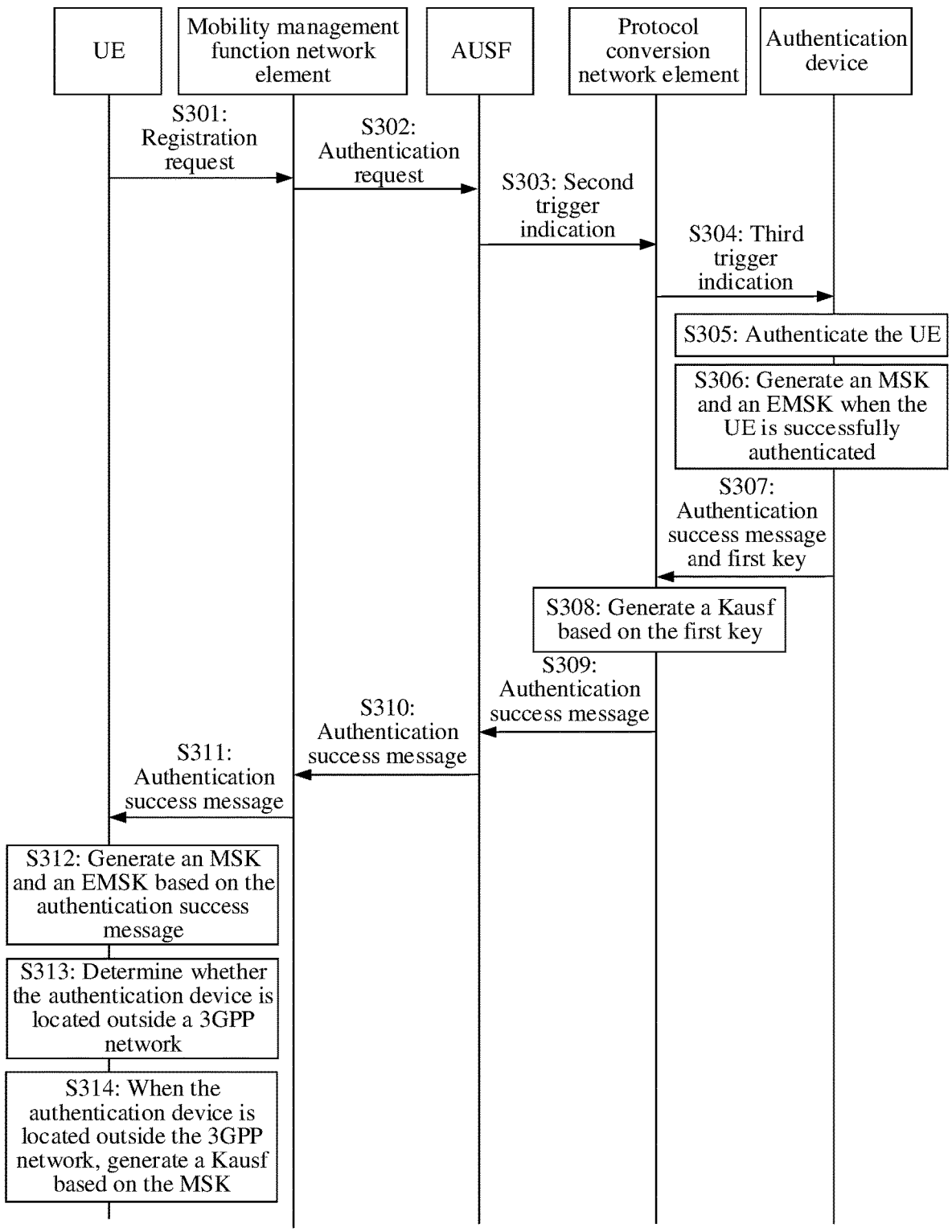
FIG. 3 is a schematic flowchart of another key derivation method according to an embodiment.

FIG. 3 is a schematic flowchart of another key derivation method according to an embodiment. The method describes in detail a procedure of the key derivation method when the network architecture shown in FIG. 1c includes a protocol conversion network element. Step S301 and step S312 to step S314 are performed by UE or a chip in the UE. Step S302 and step S311 are performed by a mobility management function network element or a chip in the mobility management function network element. Step S303 and step S310 are performed by an AUSF network element or a chip in the AUSF network element. Step S304, step S308, and step S309 are performed by a protocol conversion device or a chip in the protocol conversion device. Step S305 to step S307 are performed by an authentication device or a chip in the authentication device. The following uses an example in which the key derivation method is performed by the UE, the mobility management function network element, the AUSF network element, the protocol conversion device, and the authentication device for description.

The method may include, but is not limited to, the following steps.

Step S301: The UE sends a registration request to the mobility management function network element.

Step S302: After receiving the registration request, the mobility management function network element sends an authentication request to the AUSF network element.

It should be noted that, for a process of performing step S301 and step S302, refer to the descriptions of step S201 and step S202 in FIG. 2. Details are not described herein again.

Step S303: The AUSF network element sends a second trigger indication to the protocol conversion network element, where the second trigger indication is used to trigger to authenticate the UE. The second trigger indication may include an EAP-authentication trigger message, for example, an EAP-start (EAP-start) message or an EAP-identity reply message. The second trigger indication may further include explicit indication information and an identifier of the UE. For example, when the indication information is 1, it indicates that authentication on the UE is triggered; and when the indication information is 0, it indicates that authentication on the UE is not triggered. The second trigger indication may further include implicit indication information. For example, when the second trigger indication includes the identifier of the UE, it may indicate that the second trigger indication includes the implicit indication information. When the second trigger indication includes implicit indication information, it indicates that authentication on the UE is triggered. The identifier of the UE may be a first identifier of the UE or may be a second identifier of the UE.

The AUSF network element sends the second trigger indication to the protocol conversion network element, to trigger the protocol conversion network element to send a third trigger indication to the authentication device, to trigger the authentication device to authenticate the UE. For content of the second trigger indication sent by the AUSF network element, refer to related descriptions of step S203 in the embodiment in FIG. 2. Details are not described herein again.

Step S304: After receiving the second trigger indication, the protocol conversion network element sends the third trigger indication to the authentication device, where the third trigger indication is used to trigger to authenticate the UE, and the third trigger indication is obtained based on the second trigger indication.

The third trigger indication may be used to trigger the authentication device to authenticate the UE. Optionally, the third trigger indication may be the second trigger indication. In other words, the protocol conversion network element forwards the received second trigger indication to the authentication device. Alternatively, the third trigger indication is constructed by the protocol conversion network element based on the second trigger indication. For content of the third trigger indication, refer to related descriptions of the first trigger indication in step S203 in the embodiment in FIG. 2. Details are not described herein again. A difference lies in that in step S203, the first trigger indication is sent by the AUSF network element to the authentication device. In step S304, the first trigger indication is sent by the protocol conversion network element to the authentication device. For example, the protocol conversion network element obtains the second trigger indication (explicit indication) from the AUSF network element. If a value of the explicit indication information in the second trigger indication is 1, the protocol conversion network element generates the third trigger indication (EAP-start message).

Step S305: The authentication device authenticates the UE.

Step S306: When the UE is successfully authenticated, the authentication device generates an MSK and an EMSK.

It should be noted that, for a process of performing step S305 and step S306, refer to the descriptions of step S204 and step S205 in FIG. 2. Details are not described herein again.

Step S307: The authentication device sends an authentication success message and a first key to the protocol conversion network element, where the authentication success message indicates that the UE is successfully authenticated by the authentication device.

It should be noted that, for a process of performing step S307, refer to the descriptions of step S206 in FIG. 2. Details are not described herein again. A difference lies in that in step S206, the authentication success message and the first key are sent by the authentication device to the AUSF network element, and in step S307, the authentication success message and the first key are sent by the authentication device to the protocol conversion network element.

Step S308: The protocol conversion network element generates an authentication service key Kausf based on the first key.

It should be noted that in step S308, that the protocol conversion network element generates Kausf after receiving the authentication success message and the first key from the authentication device is merely used as an example and does not constitute a limitation on this embodiment. In another feasible implementation, after receiving the authentication success message and the first key from the authentication device, the protocol conversion network element may send the authentication success message and the first key to the AUSF network element. Correspondingly, the AUSF network element may generate Kausf based on the first key from the protocol conversion network element. In other words, on the network side, a network element that generates Kausf may be the protocol conversion network element or the AUSF network element. When the network element that generates Kausf is the protocol conversion network element, the protocol conversion network element may send the generated Kausf to the AUSF network element, and the AUSF network element derives a Kseaf from Kausf. For a subsequent process of deriving a Kamf from the Kseaf, refer to descriptions of a corresponding procedure in FIG. 1B. Details are not described herein again.

Key derivation is implemented based on a one-way function (hash function). Therefore, although the AUSF network element receives Kausf, the AUSF network element cannot learn of the first key used to derive Kausf. This implements key isolation between the protocol conversion network element and the AUSF network element. Key isolation between the protocol conversion network element and the AUSF network element means that the AUSF network element cannot learn of a key (that is, the first key) used by the protocol conversion network element. When Kausf received by the AUSF network element is from the authentication device, key isolation between the AUSF network element and the authentication device can be implemented.

It should be noted that a process in which the protocol conversion network element generates Kausf based on the first key may be the same as a process in which the AUSF network element generates Kausf based on the first key. For details, refer to the descriptions of step S207 in FIG. 2. Details are not described herein again.

Step S309: The protocol conversion network element sends the authentication success message to the AUSF network element.

It should be noted that step S308 and step S309 are performed in any sequence and may be performed simultaneously or sequentially.

Step S310: After receiving the authentication success message from the protocol conversion network element, the AUSF network element sends the authentication success message to the mobility management function network element.

Step S311: After receiving the authentication success message from the AUSF network element, the mobility management function network element sends the authentication success message to the UE.

Step S312: The UE generates an MSK and an EMSK based on the authentication success message.

Step S313: The UE determines whether the authentication device is located outside the 3GPP network.

Step S314: When the authentication device is located outside the 3GPP network, the UE generates an authentication service key Kausf based on the MSK.

It should be noted that, for a process of performing step S311 to step S314, refer to the descriptions of step S209 to step S212 in FIG. 2. Details are not described herein again.

In this embodiment, the protocol conversion network element derives Kausf, so that even if the AUSF network element receives Kausf, the AUSF network element cannot learn of the first key used to derive Kausf. Therefore, key isolation between the protocol conversion network element and the AUSF network element can be implemented, to improve communication security.

Figure 4:
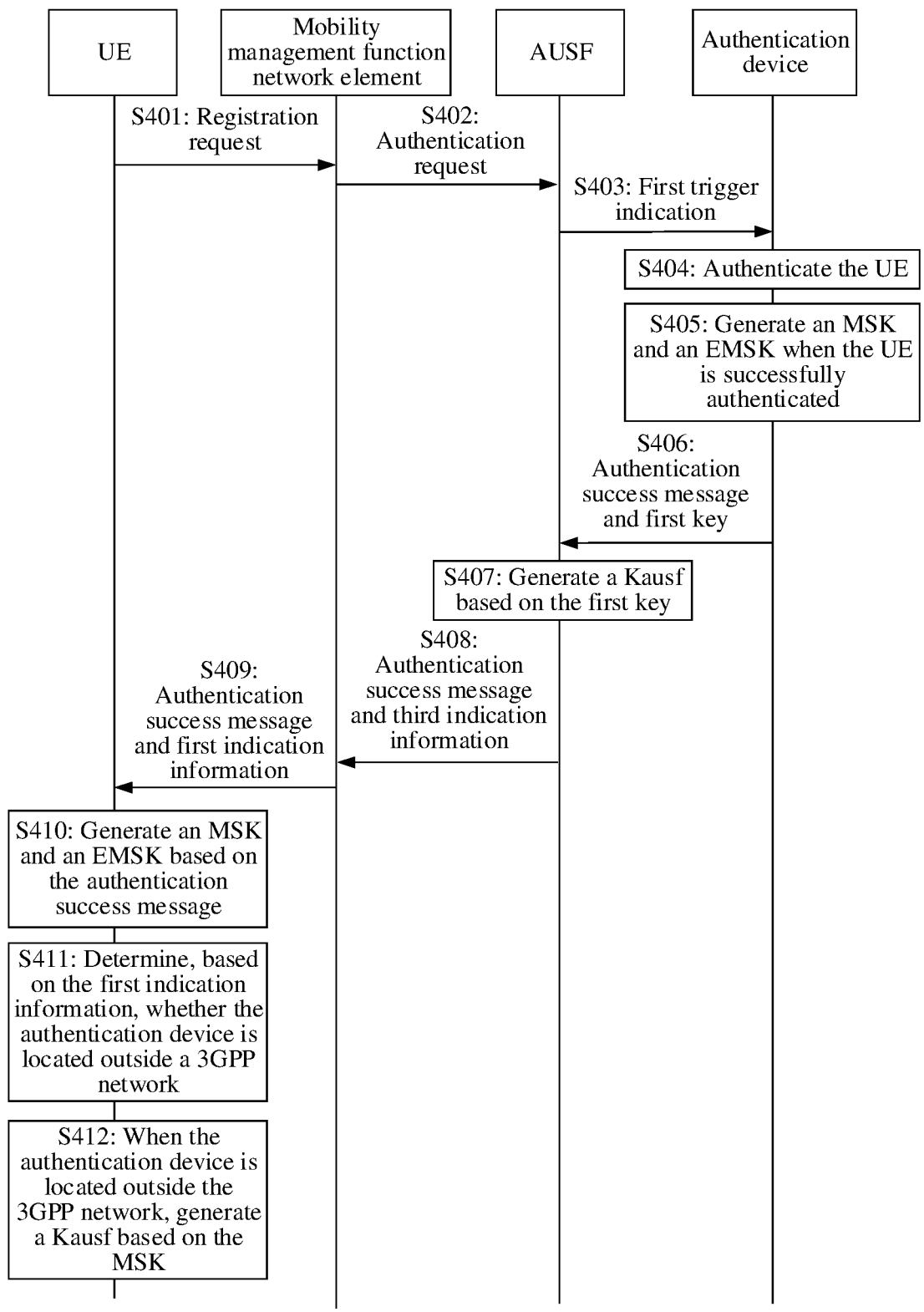
FIG. 4 is a schematic flowchart of still another key derivation method according to an embodiment.
Figure 5:
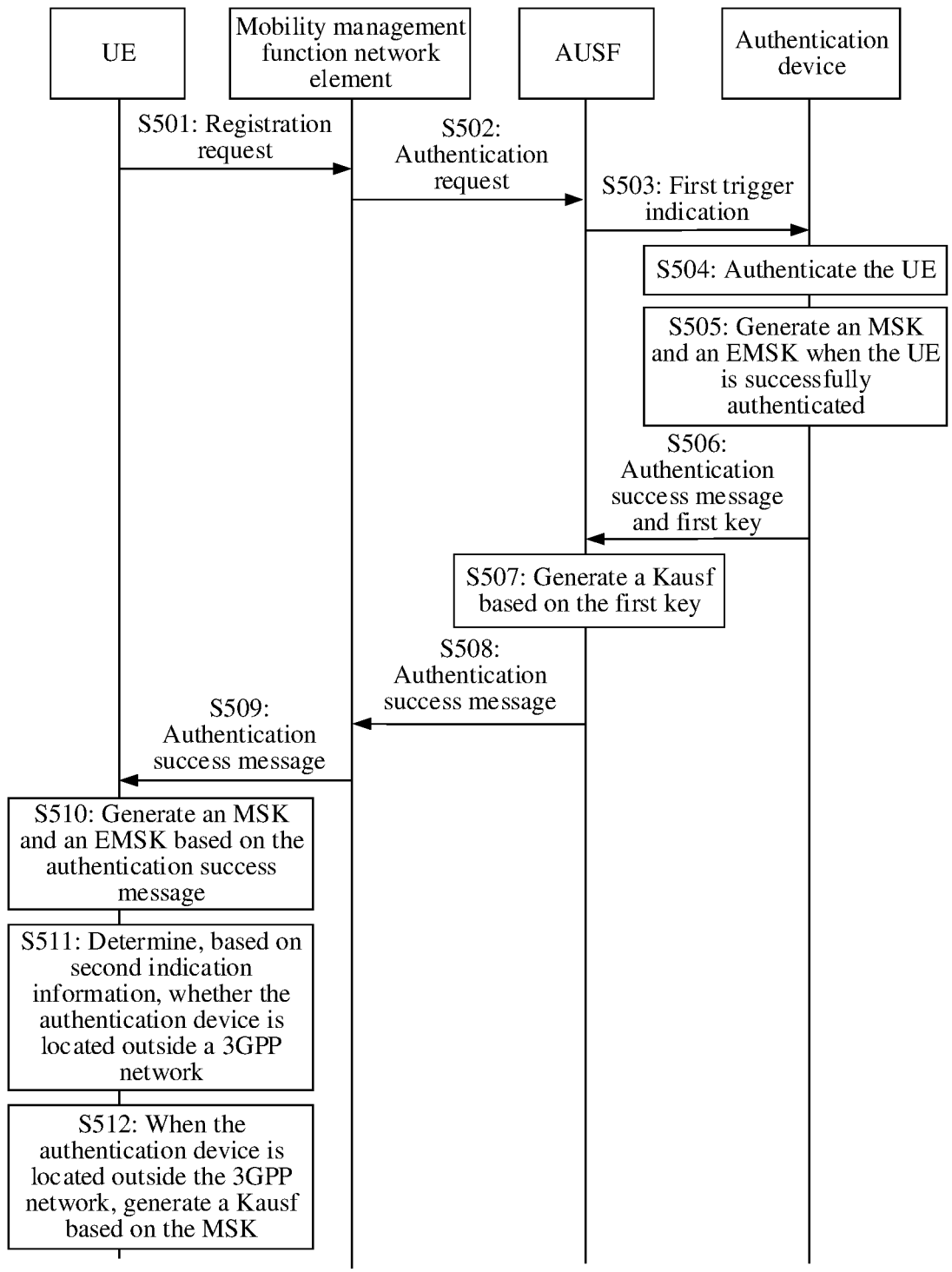
FIG. 5 is a schematic flowchart of still another key derivation method according to an embodiment.

It should be noted that, in the embodiments of FIG. 4 and FIG. 5, an example in which a network architecture for implementing the key derivation method does not include a protocol conversion network element is used, and this does not constitute a limitation on embodiments. A protocol conversion network element may be deployed in the network architecture for implementing the key derivation method in the embodiment of FIG. 4 or FIG. 5. When the protocol conversion network element is deployed, for a procedure of the key derivation method, refer to the descriptions in the embodiment of FIG. 3.

FIG. 4 is a schematic flowchart of still another key derivation method according to an embodiment. The method describes in detail that UE determines, based on first indication information, whether an authentication device is located outside a 3GPP network. Step S401 and step S410 to step S412 are performed by the UE or a chip in the UE. Step S402 and step S409 are performed by a mobility management function network element or a chip in the mobility management function network element. Step S403, step S407, and step S408 are performed by an AUSF network element or a chip in the AUSF network element. Step S404 to step S406 are performed by an authentication device or a chip in the authentication device. The following uses an example in which the key derivation method is performed by the UE, the mobility management function network element, the AUSF network element, and the authentication device for description. The method may include, but is not limited to, the following steps.

Step S401: The UE sends a registration request to the mobility management function network element.

Step S402: After receiving the registration request, the mobility management function network element sends an authentication request to the AUSF network element.

Step S403: The AUSF network element sends a first trigger indication to the authentication device, where the first trigger indication is used to trigger to authenticate the UE.

Step S404: The authentication device authenticates the UE.

Step S405: When the UE is successfully authenticated, the authentication device generates an MSK and an EMSK.

Step S406: The authentication device sends an authentication success message and a first key to the AUSF network element, where the authentication success message indicates that the UE is successfully authenticated by the authentication device.

Step S407: The AUSF network element generates an authentication service key Kausf based on the first key.

It should be noted that, for a process of performing step S401 to step S407, refer to the descriptions of step S201 to step S207 in FIG. 2. Details are not described herein again.

Step S408: The AUSF network element sends the authentication success message and third indication information to the mobility management function network element.

The third indication information indicates that the authentication device is located outside the 3GPP network or inside the 3GPP network; or the third indication information may indicate to derive Kausf by using the MSK (or the first key); or the third indication information may indicate to derive Kausf by using the EMSK; or the third indication information may indicate to derive Kausf in Derivation manner 1; or the third indication information may indicate to derive Kausf in Derivation manner 2.

Alternatively, the third indication information may indicate that a key used for deriving Kausf is obtained from an external network (or outside the 3GPP network); or the third indication information may indicate that a key used for deriving Kausf is obtained from an internal network (or inside the 3GPP network); or the third indication information may indicate that a key used for deriving Kausf is obtained from a network element in an external network (or outside the 3GPP network); or the third indication information may indicate that a key used to derive Kausf is obtained from a network element in an internal network (or inside the 3GPP network).

Alternatively, the third indication information may indicate that authentication in which an authentication credential is located in a third party independent of an SNPN is being performed; or the third indication information may indicate that external (or 3GPP external) authentication is being performed. Alternatively, the third indication information may indicate that authentication in which an authentication credential is located in a third party independent of an SNPN is completed; or the third indication information may indicate that external (or 3GPP external) authentication is completed. Alternatively, the third indication information may indicate that authentication in which an authentication credential is located in a third party independent of an SNPN is about to be performed; or the third indication information may indicate that external (or 3GPP external) authentication is about to be performed. It should be noted that a function of the third indication information mentioned in this embodiment may be used as an example. In implementation, a manner in which the UE enables, based on indication information from a network side, the generated Kausf to be the same as Kausf generated on the network side falls within the scope of the embodiments. The third indication information may also be referred to as a second derivation indication.

The AUSF network element sends the third indication information to the mobility management function network element, so that the mobility management function network element can learn of whether the authentication device is located outside the 3GPP network. This helps the mobility management function network element notify the UE (based on the first indication information) whether the authentication device is located outside the 3GPP network. Alternatively, the AUSF network element sends the third indication information to the mobility management function network element, so that the mobility management function network element may forward the third indication information to the UE, and the UE learns of whether the authentication device is located outside the 3GPP network. In this case, the third indication information is the same as the first indication information.

It should be noted that the AUSF network element may send the third indication information during authentication, or may send the third indication information after authentication is completed. It should be further noted that a sequence of sending the authentication success message and sending the third indication information by the AUSF network element is not limited.

In this embodiment, the AUSF network element may send the third indication information to the mobility management function network element when determining that the UE needs to perform authentication with the authentication device. Optionally, the AUSF network element may send the third indication information to the mobility management function network element when sending the first trigger indication to the authentication device. Optionally, the AUSF network element may send the third indication information to the mobility management function network element when receiving the authentication success message from the authentication device. Optionally, the AUSF network element may send the third indication information to the mobility management function network element when sending the first trigger indication to the authentication device and receiving the authentication success message from the authentication device. Optionally, the AUSF network element may send the third indication information to the mobility management function network element when sending a second trigger indication to the protocol conversion network element. Optionally, the AUSF network element may send the third indication information to the mobility management function network element when receiving the authentication success message from the protocol conversion network element. Optionally, the AUSF network element may send the third indication information to the mobility management function network element when sending the second trigger indication to the protocol conversion network element and receiving the authentication success message from the protocol conversion network element.

Step 5409: After receiving the authentication success message and the third indication information from the AUSF network element, the mobility management function network element sends the authentication success message and the first indication information to the UE.

The first indication information may indicate that the authentication device is located outside the 3GPP network or inside the 3GPP network, and the third indication information is determined based on the first indication information. It should be noted that the first indication information and the third indication information indicate same content. For the content of the first indication information, refer to the descriptions in step 5408.

In an implementation, the first indication information may be indicated by an existing information element. In this case, the first indication information is an implicit indication, in other words, no new message is generated or no new message element is added to an existing message. For example, when the information element is ABBA, the first indication information includes the ABBA. When the mobility management function network element receives the third indication information, and the third indication information indicates that the authentication device is located outside the 3GPP network, the mobility management function network element may determine that a value of the ABBA is a non-zero value. When the value of the ABBA is a non-zero value, the ABBA indicates that the authentication device is located outside the 3GPP network. It may be understood that when the third indication information indicates that the authentication device is located inside the 3GPP network, the mobility management function network element may determine that a value of the ABBA is 0. When the value of the ABBA is 0, the ABBA indicates that the authentication device is located inside the 3GPP network. It should be noted that a meaning represented by the value of the ABBA is used as an example and does not constitute a limitation on this embodiment. For example, when the value of ABBA is 0, the ABBA may indicate that the authentication device is located outside the 3GPP network. When the value of ABBA is the non-zero value, the ABBA may indicate that the authentication device is located inside the 3GPP network. An existing information element is used to indicate the first indication information, so that modifications to an existing protocol can be reduced.

In another implementation, the first indication information may include a flag 1 (flag) or an indication field 1. The flag 1 (or the indication field 1) may indicate that the authentication device is located outside the 3GPP network or inside the 3GPP network. For example, if the first indication information includes the flag 1 (or the indication field 1), the first indication information may indicate that the authentication device is located outside the 3GPP network. It may be understood that if the first indication information does not include the flag 1 (or the indication field 1), the first indication information may indicate that the authentication device is located inside the 3GPP network. Alternatively, if the first indication information includes the flag 1 (or the indication field 1), the first indication information may indicate that the authentication device is located inside the 3GPP network. If the first indication information does not include the flag 1 (or the indication field 1), the first indication information may indicate that the authentication device is located outside the 3GPP network. The mobility management function network element may determine, based on content indicated by the third indication information, whether the constructed first indication information includes the flag 1 (or the indication field 1).

In still another implementation, the mobility management function network element may forward the received third indication information to the UE. In this case, the third indication information is the same as the first indication information, and both the third indication information and the first indication information are explicit indication.

Step S410: The UE generates the MSK and the EMSK based on the authentication success message.

It should be noted that, for a process of performing step S410, refer to the descriptions of step S210 in FIG. 2. Details are not described herein again.

Step S411: The UE determines, based on the first indication information, whether the authentication device is located outside the 3GPP network.

After receiving the first indication information from the mobility management function network element, the UE may determine, based on the first indication information, whether the authentication device is located outside the 3GPP network.

The UE may determine, based on content indicated by the first indication information, whether the authentication device is located outside the 3GPP network. For example, the first indication information may indicate that the authentication device is located outside the 3GPP network, so that the UE determines whether the authentication device is located outside the 3GPP network.

In an implementation, the first indication information and the third indication information may indicate, by using a carried indication parameter, whether the authentication device is located outside the 3GPP network or within the 3GPP network. For example, the third indication information includes an indication parameter. When a value of the indication parameter is not 0, the third indication information may indicate that the authentication device is located outside the 3GPP network. When the value of the indication parameter is 0, the third indication information may indicate that the authentication device is located inside the 3GPP network. After receiving the third indication information, if the mobility management function network element forwards the third indication information, the first indication information is the same as the third indication information. In other words, the first indication information also includes the indication parameter. The UE may determine, based on the value of the indication parameter in the first indication information, whether the authentication device is located outside the 3GPP network.

Optionally, the UE may determine, depending on whether the UE receives the first indication information, whether the authentication device is located outside the 3GPP network. For example, when the first indication information indicates that the authentication device is located outside the 3GPP network, if the UE does not receive the first indication information when receiving the authentication success message from the mobility management function network element, the UE may determine whether the authentication device is located inside the 3GPP network. Similarly, when the first indication information indicates that the authentication device is located inside the 3GPP network, if the UE does not receive the first indication information when receiving the authentication success message from the mobility management function network element, the UE may determine whether the authentication device is located outside the 3GPP network. Optionally, when determining that the authentication device is located inside the 3GPP network, the mobility management function network element may not send the first indication information to the UE.

It may be understood that for the third indication information, the mobility management function network element may alternatively determine, depending on whether mobility management function network element receives the third indication information, whether the authentication device is located outside the 3GPP network. For example, when the third indication information indicates that the authentication device is located outside the 3GPP network, if the mobility management function network element does not receive the third indication information when receiving the authentication success message, the mobility management function network element may determine whether the authentication device is located inside the 3GPP network. Similarly, when the third indication information indicates that the authentication device is located inside the 3GPP network, if the mobility management function network element does not receive the third indication information when receiving the authentication success message, the mobility management function network element may determine that the authentication device is located outside the 3GPP network.

Step S412: When the authentication device is located outside the 3GPP network, the UE generates an authentication service key Kausf based on the MSK.

It should be noted that, for a process of performing step 5412, refer to the descriptions of step S212 in FIG. 2. Details are not described herein again.

In this embodiment, the Kamf may be derived based on the Kseaf, the ABBA, and a SUPI. By using the existing information element ABBA as the first indication information, in an aspect, modifications to an existing protocol can be reduced. In another aspect, because the ABBA is also a parameter for deriving the Kamf, if the ABBA is tampered with, the Kamf generated by the UE is different from the Kamf generated by the mobility management function network element. In this way, an attack can be discovered, thereby helping improve communication security.

In an implementation, when the authentication device is located inside the 3GPP network, the UE may generate Kausf based on the EMSK. For related content of generating Kausf by the UE based on the EMSK, refer to the descriptions in step S211. Details are not described herein again.

In this embodiment, the first indication information indicates that the authentication device is located outside the 3GPP network or inside the 3GPP network, and the UE may determine, based on the first indication information, a derivation manner (or the EMSK or the MSK) used to derive Kausf.

FIG. 5 is a schematic flowchart of still another key derivation method according to an embodiment. The embodiment shown in FIG. 5 describes in detail how UE determines, based on first configuration information preconfigured in the UE, whether an authentication device is located outside a 3GPP network. Step S501 and step S510 to step S512 are performed by the UE or a chip in the UE. Step S502 and step S509 are performed by a mobility management function network element or a chip in the mobility management function network element. Step S503, step S507, and step S508 are performed by an AUSF network element or a chip in the AUSF network element. Step S504 to step S506 are performed by an authentication device or a chip in the authentication device. The following uses an example in which the key derivation method is performed by the UE, the mobility management function network element, the AUSF network element, and the authentication device for description. The method may include, but is not limited to, the following steps.

Step S501: The UE sends a registration request to the mobility management function network element.

Step S502: After receiving the registration request, the mobility management function network element sends an authentication request to the AUSF network element.

Step S503: The AUSF network element sends a first trigger indication to the authentication device, where the first trigger indication is used to trigger to authenticate the UE.

Step S504: The authentication device authenticates the UE.

Step S505: When the UE is successfully authenticated, the authentication device generates an MSK and an EMSK.

Step S506: The authentication device sends an authentication success message and a first key to the AUSF network element, where the authentication success message indicates that the UE is successfully authenticated by the authentication device.

Step S507: The AUSF network element generates an authentication service key Kausf based on the first key.

Step S508: The AUSF network element sends the authentication success message to the mobility management function network element.

Step S509: After receiving the authentication success message from the AUSF network element, the mobility management function network element sends the authentication success message to the UE.

Step S510: The UE generates the MSK and the EMSK based on the authentication success message.

It should be noted that, for a process of performing step S501 to step S510, refer to the descriptions of step S201 to step S210 in FIG. 2. Details are not described herein again.

Step S511: The UE determines, based on second indication information, whether the authentication device is located outside the 3GPP network.

In this embodiment, the UE may determine, in the following manners, whether the authentication device is located outside the 3GPP network.

In an implementation, the UE determines, based on the second indication information, whether the authentication device is located outside the 3GPP network. The second indication information indicates whether the authentication device is located outside the 3GPP network. The second indication information is included in first configuration information, and the first configuration information and a first authentication credential may be preconfigured in the UE.

When determining to use the first authentication credential to perform EAP authentication, the UE may obtain the first authentication credential and may generate the MSK and the EMSK based on the first authentication credential. When obtaining the first authentication credential, the UE may obtain the first configuration information corresponding to the first authentication credential, and determine, based on the second indication information in the first configuration information, whether the authentication device is located outside the 3GPP network. Optionally, the UE selects a first network based on an identifier broadcast by a network, and then determines the first authentication credential corresponding to the first network.

It should be noted that the second indication information may be explicit indication information or implicit indication information. An example in which the second indication information is the explicit indication information is as follows: The second indication information is a 1-bit binary bit (represented as 0 or 1). When a value of the second indication information is 1, the second indication information indicates that the authentication device is located outside the 3GPP network. When a value of the second indication information is 0, the second indication information indicates that the authentication device is located inside the 3GPP network. Alternatively, when a value of the second indication information is 0, the second indication information indicates that the authentication device is located outside the 3GPP network. When a value of the second indication information is 1, the second indication information indicates that the authentication device is located inside the 3GPP network.

An example in which the second indication information is the implicit indication information is as follows: The second indication information includes a flag 2 or an indication field 2, and the flag 2 (or the indication field 2) indicates that the authentication device is located outside the 3GPP network or inside the 3GPP network. For example, if the flag 2 (or the indication field 2) indicates that the authentication device is located outside the 3GPP network, and the second indication information includes the flag 2 (or the indication field 2), the second indication information indicates that the authentication device is located outside the 3GPP network. It may be understood that if the second indication information does not include the flag 2 (or the indication field 2), the second indication information may indicate that the authentication device is located inside the 3GPP network. Alternatively, if the flag 2 (or the indication field 2) indicates that the authentication device is located inside the 3GPP network, and the second indication information includes the flag 2 (or the indication field 2), the second indication information may indicate that the authentication device is located inside the 3GPP network. If the second indication information does not include the flag 2 (or the indication field 2), the second indication information may indicate that the authentication device is located outside the 3GPP network.

It should be noted that an example in which the second indication information indicates whether the authentication device is located outside the 3GPP network is used and does not constitute a limitation on this embodiment. For example, the second indication information may indicate whether an authentication credential for authenticating the UE is located outside the 3GPP network; or the second indication information may indicate to derive Kausf by using the MSK (or the first key); or the second indication information may indicate to derive Kausf by using the EMSK; or the second indication information may indicate to derive Kausf in Derivation manner 1; or the second indication information may indicate to derive Kausf in Derivation manner 2. Content indicated by the second indication information may be the same as content indicated by the first indication information (or third indication information). For details, refer to the descriptions in step 5408 and step 5409. Details are not described herein again.

In another implementation, the UE determines, based on an identifier of the authentication device, whether the authentication device is located outside the 3GPP network. Optionally, if the UE obtains the identifier of the authentication device, the UE determines that the authentication device is located outside the 3GPP network. Optionally, if the UE does not obtain the identifier of the authentication device, the UE determines that the authentication device is located inside the 3GPP network. The identifier of the authentication device may be a service provider identifier (service provider identifier, SP ID), a PLMN ID, an SNPN ID, and the like.

The UE may obtain the identifier of the authentication device in the following manners:

1. The UE obtains identifiers of one or more authentication devices from a broadcast message of an access network device, and the UE selects an identifier of a first authentication device. For example, the UE displays, to a user, identifiers of all authentication devices obtained from the broadcast message, and the user manually selects the identifier of the first authentication device.

2. The UE preconfigures a correspondence between an identifier of an access network and the identifier of the authentication device. The UE obtains identifiers of one or more access networks from a broadcast message of an access network device, and the UE selects an identifier of a first access network. The UE may obtain, based on the preconfigured correspondence, the identifier of the authentication device corresponding to the identifier of the first access network. For example, the UE selects the identifier of the first access network based on a network priority list and obtains the identifier of the first authentication device based on the preconfigured correspondence between the identifier of the first access network and the identifier of the first authentication device.

3. The UE obtains identifiers of one or more access networks from a broadcast message of an access network device, selects an identifier of a first access network, accesses the first access network, and then receives the identifier of the authentication device from the first access network.

Before the authentication device performs authentication (for example, EAP authentication) on the UE, the UE may obtain the identifier of the authentication device in any one of the foregoing manners. Then, after the UE is successfully authenticated by the authentication device, the UE may generate Kausf in Derivation manner 2. Optionally, when the UE cannot obtain the identifier of the authentication device, the UE may generate Kausf in Derivation manner 1.

Step S512: When the authentication device is located outside the 3GPP network, the UE generates the authentication service key Kausf based on the MSK.

It should be noted that, for a process of performing step S512, refer to the descriptions of step S212 in FIG. 2. Details are not described herein again.

In this embodiment, the UE determines, based on the preconfigured second indication information in the UE, whether the authentication device is located outside the 3GPP network, and the network side does not need to send indication information to the UE (in other words, the AUSF network element does not need to send the third indication information to the mobility management function network element, and the mobility management function network element does not need to send the first indication information to the UE). This helps reduce power consumption of the network side device.

Corresponding to the methods provided in the foregoing method embodiments, an embodiment may further provide a corresponding apparatus. The apparatus includes corresponding modules configured to perform the foregoing embodiments. The module may be software, hardware, or a combination of software and hardware.

Figure 6:
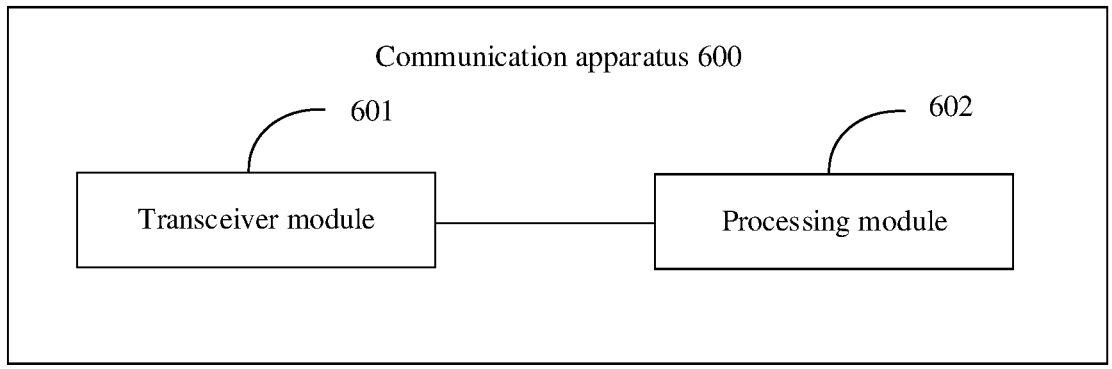
FIG. 6 is a schematic diagram of a structure of a communication apparatus according to an embodiment.

FIG. 6 is a schematic diagram of a structure of a communication apparatus. The communication apparatus 600 shown in FIG. 6 includes a transceiver module 601 and a processing module 602.

The apparatus 600 may be UE.

For example, the transceiver module 601 is configured to receive an authentication success message from a mobility management function network element, where the authentication success message indicates that the UE is successfully authenticated by an authentication device.

The processing module 602 is configured to generate an MSK and an EMSK based on the authentication success message; determine whether the authentication device is located outside a 3GPP network; and when the authentication device is located outside the 3GPP network, generate Kausf based on the MSK.

When the apparatus 600 is the UE, the apparatus 600 is configured to implement functions of the UE in the embodiments shown in FIG. 2 to FIG. 5.

The apparatus 600 may be an AUSF network element.

For example, the transceiver module 601 is configured to send a first trigger indication to an authentication device, where the first trigger indication is used to trigger to authenticate the UE; and receive an authentication success message and a first key from the authentication device, where the authentication success message indicates that the UE is successfully authenticated by the authentication device.

The processing module 602 is configured to generate Kausf based on the first key.

The transceiver module 601 is further configured to send the authentication success message and third indication information to a mobility management function network element, where the third indication information indicates that the authentication device is located outside a 3GPP network or inside the 3GPP network.

When the apparatus 600 is the AUSF network element, the apparatus 600 is configured to implement functions of the AUSF network element in the embodiments shown in FIG. 2 to FIG. 5.

The apparatus 600 may be a mobility management function network element.

For example, the transceiver module 601 is configured to receive an authentication success message and second indication information from an AUSF network element, where the authentication success message indicates that UE is successfully authenticated by an authentication device, the second indication information indicates that the authentication device is located outside a 3GPP network or inside the 3GPP network; and send the authentication success message and first indication information to the UE, where the first indication information indicates that the authentication device is located outside the 3GPP network or inside the 3GPP network, and the second indication information is determined based on the first indication information.

When the apparatus 600 is the mobility management function network element, the apparatus 600 is configured to implement functions of the mobility management function network element in the embodiments shown in FIG. 2 to FIG. 5.

The apparatus 600 may be a protocol conversion network element.

For example, the transceiver module 601 is configured to receive a second trigger indication from an AUSF network element, where the second trigger indication is used to trigger to authenticate UE; send a third trigger indication to an authentication device, where the third trigger indication is used to trigger to authenticate the UE, and the third trigger indication is obtained based on the second trigger indication; and receive an authentication success message and a first key from the authentication device, where the authentication success message indicates that the UE is successfully authenticated by the authentication device.

The processing module 602 is configured to generate Kausf based on the first key.

The transceiver module 601 is further configured to send the authentication success message to the AUSF network element.

When the apparatus 600 is the protocol conversion network element, the apparatus 600 is configured to implement functions of the protocol conversion network element in the embodiment shown in FIG. 3.

Figure 7:
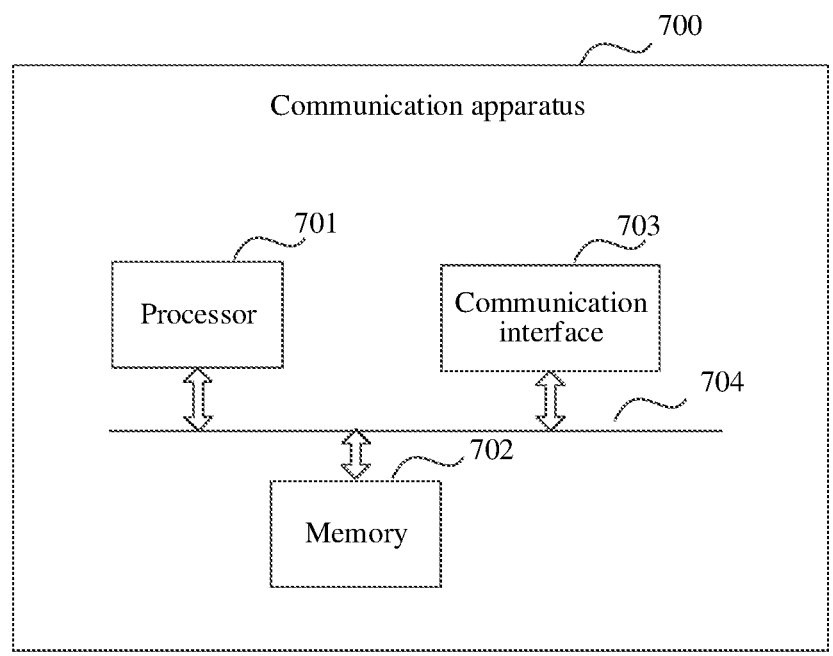
FIG. 7 is a schematic diagram of a structure of another communication apparatus according to an embodiment.

FIG. 7 is a schematic diagram of a structure of another communication apparatus. The communication apparatus 700 shown in FIG. 7 includes at least one processor 701 and a memory 702, and optionally, may further include a communication interface 703.

The memory 702 may be a volatile memory, for example, a random access memory; or the memory may be a non-volatile memory, for example, a read-only memory, a flash memory, a hard disk drive (HDD), or a solid-state drive (SSD); or the memory 702 is any other medium that can be used to carry or store expected program code in a form of an instruction or a data structure and that can be accessed by a computer, but is not limited thereto. The memory 702 may be a combination of the foregoing memories.

In this embodiment, a connection medium between the processor 701 and the memory 702 is not limited. In this embodiment, in the figure, the memory 702 and the processor 701 are connected through a bus 704. The bus 704 is represented by a bold line in the figure. A connection manner between other components is described merely as an example and does not constitute any limitation. The bus 704 may be classified as an address bus, a data bus, a control bus, and the like. For ease of representation, only one bold line is used for representation in FIG. 7, but this does not mean that there is only one bus or only one type of bus.

The processor 701 may have a data transceiver function and may communicate with another device. In the apparatus in FIG. 7, an independent data transceiver module, for example, the communication interface 703, may be disposed for data sending and receiving. When communicating with another device, the processor 701 may perform data transmission through the communication interface 703.

In an example, when UE uses the form shown in FIG. 7, the processor in FIG. 7 may invoke computer-executable instructions stored in the memory 702, so that the UE is enabled to perform the method performed by the UE in any one of the foregoing method embodiments.

In an example, when an AUSF network element uses the form shown in FIG. 7, the processor in FIG. 7 may invoke computer-executable instructions stored in the memory 702, so that the AUSF network element is enabled to perform the method performed by the AUSF network element in any one of the foregoing method embodiments.

In an example, when a mobility management function network element uses the form shown in FIG. 7, the processor in FIG. 7 may invoke computer-executable instructions stored in the memory 702, so that the mobility management function network element is enabled to perform the method performed by the mobility management function network element in any one of the foregoing method embodiments.

In an example, when a protocol conversion network element uses the form shown in FIG. 7, the processor in FIG. 7 may invoke computer-executable instructions stored in the memory 702, so that the protocol conversion network element is enabled to perform the method performed by the protocol conversion network element in any one of the foregoing method embodiments.

At least one of functions and implementation processes of the processing module and the transceiver module in FIG. 6 may be implemented by the processor 701 in FIG. 7 by invoking the computer-executable instructions stored in the memory 702. Alternatively, functions/implementation processes of the processing module in FIG. 6 may be implemented by the processor 701 in FIG. 7 by invoking the computer-executable instructions stored in the memory 702, and at least one of the functions and implementation processes of the transceiver module in FIG. 6 may be implemented by the communication interface 703 in FIG. 7.

An embodiment may further provide a key derivation system. The system may include the mobility management function network element and the AUSF network element in FIG. 2 to FIG. 5. Optionally, the system further includes the UE in FIG. 2 to FIG. 5. Optionally, the system further includes the protocol conversion network element in FIG. 3.

It may be understood that, in some scenarios, some optional features in embodiments may be independently implemented without depending on another feature, for example, a solution on which the optional features are currently based, to resolve a corresponding problem and achieve a corresponding effect. Alternatively, in some scenarios, the optional features are combined with other features based on requirements. Correspondingly, the apparatus provided in embodiments may also correspondingly implement these features or functions. Details are not described herein.

A person skilled in the art may further understand that various illustrative logical blocks and steps that are listed in the embodiments may be implemented by electronic hardware, computer software, or a combination thereof. Whether the functions are implemented by hardware or software depends on particular applications and a requirement of the entire system. A person skilled in the art may use various methods to implement the functions for corresponding applications, but it should not be considered that the implementation goes beyond the scope of the embodiments.

The solutions may be implemented in various manners. For example, the technologies may be implemented by hardware, software, or a combination thereof. For hardware implementation, a processing module configured to execute these technologies at a communication apparatus (for example, a base station, a terminal, a network entity, a core network element, or a chip) may be implemented in one or more general-purpose processors, digital signal processors (DSP), digital signal processor components, or application-specific integrated circuits (ASIC), programmable logic devices, field programmable gate arrays (FPGA), or another programmable logic apparatus, discrete gate or transistor logic, discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in the embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the system and methods aims to include, but is not limited to, these and any memory of another appropriate type.

The embodiments may further provide a non-transitory computer-readable medium storing a computer program. When the computer program is executed by a computer, functions of any one of the foregoing method embodiments are implemented.

The embodiments may further provide a computer program product. When the computer program product is executed by a computer, functions of any one of the foregoing method embodiments are implemented.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to embodiments are all or partially generated. The computer may be a general-purpose computer, a dedicated computer, a computer network, or another programmable apparatus. The computer instructions may be stored in a non-transitory computer-readable storage medium. The non-transitory computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc ( )), a semiconductor medium (for example, a solid state disk (SSD)), or the like.

It may be understood that "an embodiment" means that particular features, structures, or characteristics related to the embodiment are included in at least one embodiment. Therefore, embodiments do not necessarily refer to a same embodiment. In addition, these particular features, structures, or characteristics may be combined in one or more embodiments by using any appropriate manner. It may be understood that sequence numbers of the foregoing processes do not mean an execution sequence in the various embodiments. The execution sequence of the processes should be determined based on functions and internal logic of the processes and should not be construed as any limitation on the implementation processes of the embodiments.

It should be understood that "when" and "if" mean that an apparatus performs corresponding processing in an objective situation, and are not intended to limit time. The terms do not mean that the apparatus is required to have a determining action during implementation, and do not mean any other limitation.

An element represented in a singular form is intended to represent "one or more", but does not represent "one and only one", unless otherwise specified, while "at least one" is intended to represent "one or more", and "a plurality of" is intended to represent "two or more".

In addition, the terms "system" and "network" may be used interchangeably in this specification. The term "and/or" describes only an association relationship between associated objects and represents that three relationships may exist. For example, A and/or B may represent the following three cases: only A exists, both A and B exist, and only B exists. A may be singular or plural, and B may be singular or plural.

"Predefine" may be understood as "define", "predefine", "store", "pre-store", "pre-negotiate", "preconfigure", "solidify", or "pre-burn".

A person of ordinary skill in the art may understand that, for the purpose of convenient and brief description, for a detailed working process of the foregoing system, apparatuses, and units, refer to a corresponding process in the foregoing method embodiments. Details are not described herein again.

For same or similar parts in the embodiments, refer to each other. In the embodiments and the implementations/implementation methods in the embodiments, unless otherwise specified or a logical conflict occurs, terms and/or descriptions are consistent and may be mutually referenced between different embodiments and between the implementations/implementation methods in the embodiments. Features in the different embodiments and the implementations/implementation methods in embodiments may be combined to form a new embodiment, implementation, or implementation method based on an internal logical relationship thereof.

The foregoing descriptions are merely implementations, but are not intended as limiting scope of. Any variation or replacement readily figured out by a person skilled in the art shall fall within the scope of the embodiments.

The invention claimed is:

1. A key derivation method, comprising:
generating, by an apparatus during authentication, a master session key (MSK) and an extended master session key (EMSK), wherein the apparatus is user equipment (UE) or a chip in the UE;
after receiving an authentication success message from a mobility management function network element, determining, by the apparatus, whether to derive an authentication service key (Kausf) by using the MSK; wherein the authentication success message indicates that the apparatus is successfully authenticated by an authentication device; and
when determining to derive a Kausf by using the MSK, generating, by the apparatus, a Kausf based on the MSK;
wherein the apparatus stores first configuration information, and the first configuration information comprises second indication information indicating whether to derive a Kausf by using the MSK; and
the determining whether to derive the Kausf by using the MSK comprises:
determining, by the apparatus based on the second indication information, whether to derive the Kausf by using the MSK.

2. The key derivation method according to claim 1, wherein the generating the Kausf based on the MSK comprises:
generating, by the apparatus, the Kausf based on the MSK and a generation parameter, wherein
the generation parameter comprises one or more of the following: an identifier of a serving network that the apparatus currently accesses or an identifier of the apparatus.

3. The key derivation method according to claim 2, wherein the identifier of the apparatus comprises a first identifier of the apparatus, and the first identifier identifies the apparatus in a network other than the 3GPP network.

4. The key derivation method according to claim 1, wherein a first authentication credential corresponding to the first configuration information is preconfigured in the apparatus, wherein the generating the MSK and the EMSK comprises:
generating, by the apparatus, the MSK and the EMSK based on the first authentication credential.

5. The key derivation method according to claim 4, further comprising:
selecting, by the apparatus, a first network based on an identifier broadcast by a network, and
determining, by the apparatus, the first authentication credential corresponding to the first network.

6. The method according to claim 1, wherein the method comprises performing a following sequence of steps:
first, receiving, on the apparatus, the authentication success message from the mobility management function network element;
second, after receiving the authentication success message, generating the MSK and EMSK; and
third, after generating the MSK, determining, by the apparatus, whether to derive the Kausf using the MSK.

7. A communication apparatus being a user equipment (UE) or a chip in the UE, comprising a processor coupled to a memory storing instructions and configured to execute the instructions to cause the apparatus to:
generate, during authentication, a master session key (MSK) and an extended master session key (EMSK);
after receiving an authentication success message from a mobility management function network element, determine whether to derive an authentication service key (Kausf) by using the MSK; wherein the authentication success message indicates that the apparatus is successfully authenticated by an authentication device; and
generate a Kausf based on the MSK when determining to derive a Kausf by using the MSK;
wherein the apparatus stores first configuration information, and the first configuration information comprises second indication information indicating whether to derive the Kausf by using the MSK; and wherein the instructions cause the apparatus to determine whether to derive the Kausf by using the MSK by:
determining, based on the second indication information, whether to derive the Kausf by using the MSK.

8. The communication apparatus according to claim 7, wherein the instructions cause the apparatus to generate the Kausf based on the MSK by:
generating the Kausf based on the MSK and a generation parameter, wherein
the generation parameter comprises one or more of the following: an identifier of a serving network that the apparatus currently accesses or an identifier of the apparatus.

9. The communication apparatus according to claim 8, wherein the identifier of the apparatus comprises a first identifier of the apparatus, and the first identifier identifies the apparatus in a network other than the 3GPP network.

10. The communication apparatus according to claim 8, wherein the memory of the communication apparatus further stores instructions to, upon determining not to derive the Kausf by using the MSK, derive the Kausf using the EMSK.

11. The communication apparatus according to claim 7, wherein a first authentication credential corresponding to the first configuration information is preconfigured in the apparatus, wherein the instructions cause the apparatus to generate the MSK and the EMSK by:
generating the MSK and the EMSK based on the first authentication credential.

12. The communication apparatus according to claim 11, wherein the instructions further cause the apparatus to:
- select a first network based on an identifier broadcast by a network, and
- determine the first authentication credential corresponding to the first network.

13. The communication apparatus according to claim 7, wherein the instructions cause the apparatus to perform a following sequence of steps:
- first, receiving, on the UE, the authentication success message from the mobility management function network element;
- second, after receiving the authentication success message, generating the MSK and EMSK; and
- third, after generating the MSK, determining, by the apparatus, whether to derive the Kausf using the MSK.

14. A non-transitory computer-readable storage medium comprising instructions, which when executed, cause an apparatus that is one of a user equipment (UE) or a chip in the UE to:
- generate, during authentication, a master session key (MSK) and an extended master session key (EMSK);
- after receiving an authentication success message from a mobility management function network element, determine whether to derive an authentication service key (Kausf) by using the MSK; wherein the authentication success message indicates that the apparatus is successfully authenticated by an authentication device; and
- generate a Kausf based on the MSK when determining to derive a Kausf by using the MSK;
- wherein the apparatus stores first configuration information, and the first configuration information comprises second indication information indicating whether to derive a Kausf by using the MSK; and wherein the instructions cause the apparatus to determine whether to derive the Kausf by using the MSK by:
- determining, based on the second indication information, whether to derive a Kausf by using the MSK.

15. The non-transitory computer-readable storage medium according to claim 14, wherein the instructions cause the apparatus to generate a Kausf based on the MSK by:
- generating the Kausf based on the MSK and a generation parameter, wherein
- the generation parameter comprises one or more of the following: an identifier of a serving network that the apparatus currently accesses or an identifier of the apparatus.

16. The non-transitory computer-readable storage medium according to claim 15, wherein the identifier of the apparatus comprises a first identifier of the apparatus, and the first identifier identifies the apparatus in a network other than the 3GPP network.

17. The non-transitory computer-readable storage medium according to claim 14, wherein a first authentication credential corresponding to the first configuration information is preconfigured in the apparatus, wherein the instructions cause the apparatus to generate the MSK and the EMSK by:
- generating the MSK and the EMSK based on the first authentication credential.

18. The non-transitory computer-readable storage medium according to claim 14, wherein the instructions further cause the apparatus to:
- select a first network based on an identifier broadcast by a network, and
- determine the first authentication credential corresponding to the first network.

19. The non-transitory computer-readable storage medium according to claim 14, wherein the instructions further comprise instructions to, upon determining not to derive the Kausf by using the MSK, derive the Kausf using the EMSK.

20. The communication apparatus according to claim 14, wherein the instructions include instructions that, when executed, cause the apparatus to perform a following sequence of steps:
- first, receiving, on the UE, the authentication success message from the mobility management function network element;
- second, after receiving the authentication success message, generating the MSK and EMSK; and
- third, after generating the MSK, determining, by the apparatus, whether to derive the Kausf using the MSK.

* * * * *